(12) United States Patent
Monfort-Moros et al.

(10) Patent No.: US 10,865,933 B2
(45) Date of Patent: Dec. 15, 2020

(54) FIELD JOINT ARRANGEMENT FOR A PIPELINE AND PROTECTING METHOD THEREOF

(71) Applicant: Subsea 7 Limited, Sutton (GB)

(72) Inventors: Nicolas Monfort-Moros, London (GB); Sylvain Popineau, London (GB); Philippe Benoit Jacques Hoffmann, Paris (FR)

(73) Assignee: Subsea 7 Limited, Sutton (GB)

( * ) Notice: Subject to any disclaimer, the term of this patent is extended or adjusted under 35 U.S.C. 154(b) by 0 days.

(21) Appl. No.: 16/414,719

(22) Filed: May 16, 2019

(65) Prior Publication Data
US 2019/0271432 A1 Sep. 5, 2019

Related U.S. Application Data

(62) Division of application No. 15/538,186, filed as application No. PCT/GB2015/054123 on Dec. 22, 2015, now Pat. No. 10,295,111.

(30) Foreign Application Priority Data

Dec. 24, 2014 (GB) .................................... 1423231.8
Aug. 27, 2015 (GB) .................................... 1515264.8

(51) Int. Cl.
*F16L 59/20* (2006.01)
*F16L 13/00* (2006.01)
(Continued)

(52) U.S. Cl.
CPC .............. *F16L 59/20* (2013.01); *B21D 39/00* (2013.01); *B29C 45/00* (2013.01);
(Continued)

(58) Field of Classification Search
CPC ......... F16L 59/20; F16L 59/024; F16L 1/206; F16L 13/00; F16L 59/021; F16L 9/04;
(Continued)

(56) References Cited

U.S. PATENT DOCUMENTS 2,786,264 A * 3/1957 Colombo .......... B29C 66/53241
228/175
3,744,823 A 7/1973 Muir et al.
(Continued)

FOREIGN PATENT DOCUMENTS

CH 372518 10/1963
DE 710 108 9/1941
(Continued)

OTHER PUBLICATIONS

API Specification 5L, "Specification for Line Pipe," American Petroleum Institute, Dec. 2012.
(Continued)

*Primary Examiner* — David Bochna
*Assistant Examiner* — James A Linford
(74) *Attorney, Agent, or Firm* — Levy & Grandinetti

(57) ABSTRACT

A method protects a field joint of a pipeline, where chamfered edges of thermally-insulating parent coatings on conjoined pipe lengths are in mutual opposition about a longitudinally-extending gap. The method includes manufacturing an hourglass-shaped inner layer around the pipe lengths, which layer may be moulded. The inner layer extends longitudinally along the gap between the chamfered edges and at least partially overlies the chamfered edges. A thermally-insulating solid insert is assembled from two or more parts to lie in the gap surrounding the inner layer, and pressure is applied radially inwardly from the insert to the inner layer. An outer layer of molten material is manufactured around the insert to form a watertight barrier and to
(Continued)

form one or more melted interfaces with the inner layer. Corresponding field joint arrangements are also disclosed.

35 Claims, 14 Drawing Sheets

(51) Int. Cl.
| | |
|---|---|
| B21D 39/00 | (2006.01) |
| F16L 59/02 | (2006.01) |
| F16L 9/04 | (2006.01) |
| F16L 3/10 | (2006.01) |
| F16L 9/147 | (2006.01) |
| B29C 45/00 | (2006.01) |
| B29C 65/14 | (2006.01) |
| B29C 65/50 | (2006.01) |
| B29C 45/14 | (2006.01) |
| F16L 9/12 | (2006.01) |
| B29K 75/00 | (2006.01) |
| B29L 23/00 | (2006.01) |
| F16L 1/00 | (2006.01) |
| B29C 65/48 | (2006.01) |
| B29C 65/54 | (2006.01) |

(52) U.S. Cl.
CPC .. *B29C 45/14614* (2013.01); *B29C 45/14639* (2013.01); *B29C 45/14819* (2013.01); *B29C 65/1412* (2013.01); *B29C 65/1432* (2013.01); *B29C 65/5042* (2013.01); *F16L 3/1066* (2013.01); *F16L 3/1075* (2013.01); *F16L 9/04* (2013.01); *F16L 9/147* (2013.01); *F16L 13/00* (2013.01); *F16L 59/021* (2013.01); *F16L 59/024* (2013.01); *F16L 59/029* (2013.01); B29C 65/4815 (2013.01); B29C 65/542 (2013.01); B29K 2075/00 (2013.01); B29L 2023/225 (2013.01); F16L 1/00 (2013.01); F16L 9/121 (2013.01); Y10T 29/4998 (2015.01); Y10T 29/49982 (2015.01)

(58) Field of Classification Search
CPC ..... F16L 3/1066; F16L 3/1075; F16L 59/029; F16L 9/147; B29C 45/14614; B29C 45/14639; B29C 45/14819; B21D 39/00
See application file for complete search history.

(56) References Cited

U.S. PATENT DOCUMENTS

| | | | | |
|---|---|---|---|---|
| 4,449,852 A | * | 5/1984 | Muszynski | F16L 13/0272 405/168.2 |
| 8,506,735 B2 | | 8/2013 | Whitaker et al. | |
| 2010/0043906 A1 | * | 2/2010 | Jackson | B32B 27/30 138/149 |
| 2010/0186881 A1 | | 7/2010 | Bregonzio | |
| 2013/0306186 A1 | * | 11/2013 | Goulet | D04B 1/14 138/149 |
| 2014/0154409 A1 | | 6/2014 | Bregonzio | |
| 2017/0232649 A1 | * | 8/2017 | Wright | B29C 45/14336 285/55 |

FOREIGN PATENT DOCUMENTS

| | | |
|---|---|---|
| DE | 102007018519 | 10/2008 |
| EP | 0 145 371 | 6/1985 |
| EP | 0 220 122 | 4/1987 |
| EP | 1 310 718 | 5/2003 |
| EP | 2 302 277 | 3/2011 |
| GB | 2 165 910 | 4/1986 |
| GB | 2520717 | 6/2015 |
| WO | WO 96/05464 | 2/1996 |
| WO | WO 03/095887 | 11/2003 |
| WO | WO 2008/132279 | 11/2008 |
| WO | WO 2012/004665 | 1/2012 |
| WO | WO 2012/172451 | 12/2012 |
| WO | WO 2013/008021 | 1/2013 |
| WO | WO 2013/070074 | 5/2013 |
| WO | WO 2013/154432 | 10/2013 |

OTHER PUBLICATIONS

API Specification 17J, "Specification for Unbonded Flexible Pipe," American Petroleum Institute, May 2014.
API Recommended Practice 17B, "Recommended Practice for Flexible Pipe," American Petroleum Institute, May 2014.
API Recommended Practice 1111, "Design, Construction, Operation, and Maintenance of Offshore Hydrocarbon Pipelines," American Petroleum Institute, Sep. 2015.

\* cited by examiner

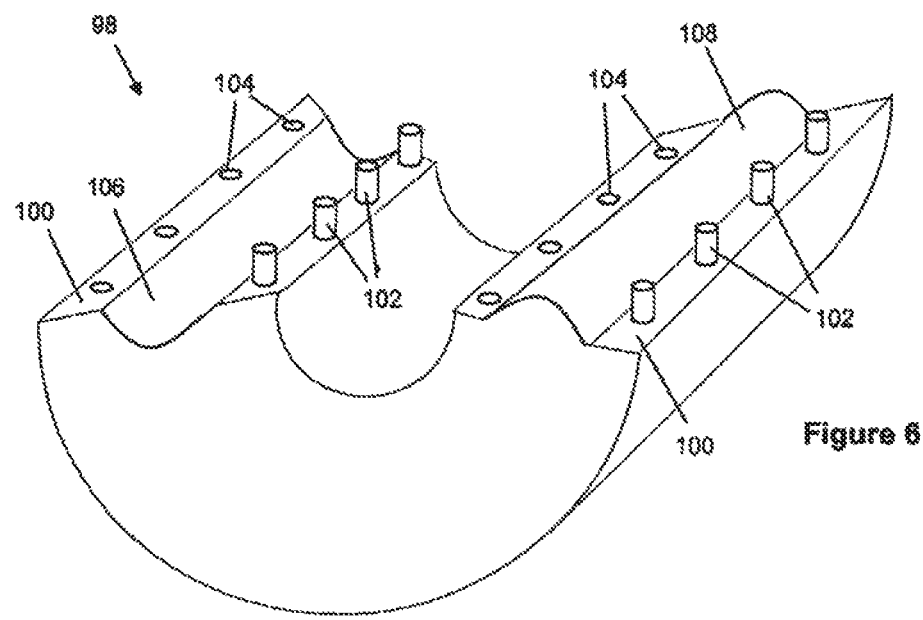
Figure 6
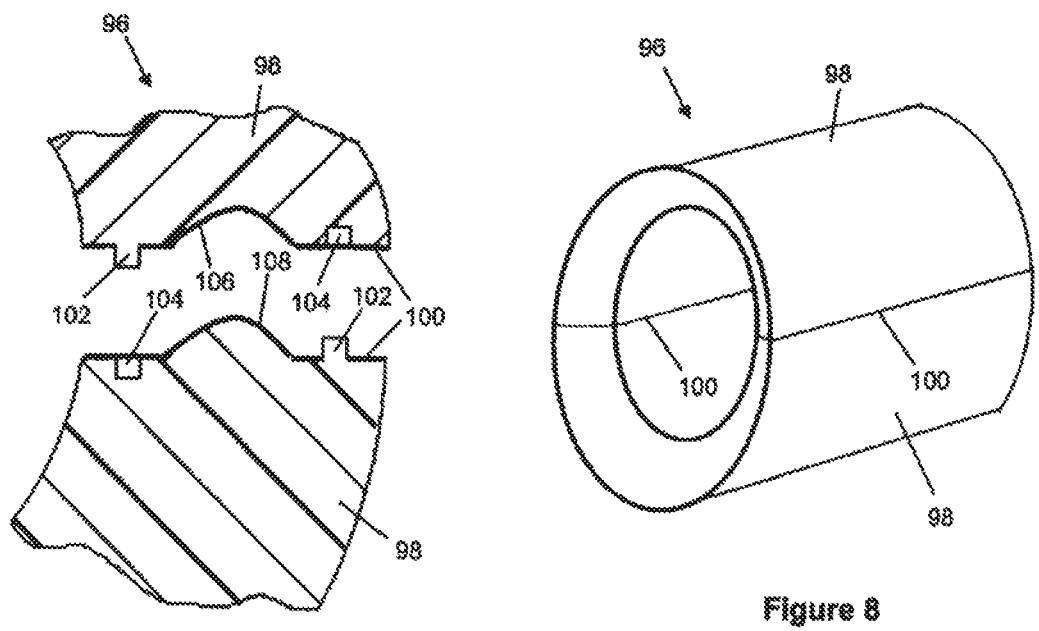
Figure 7
Figure 8

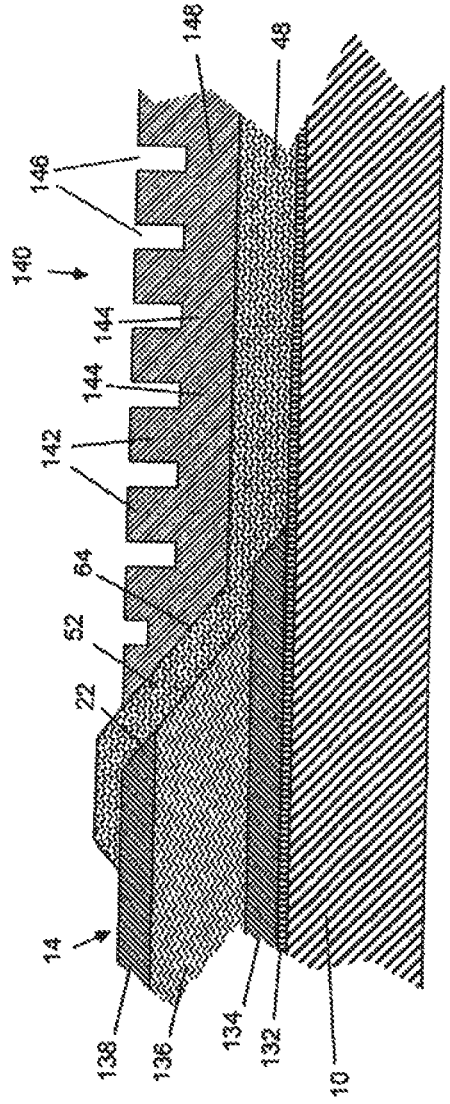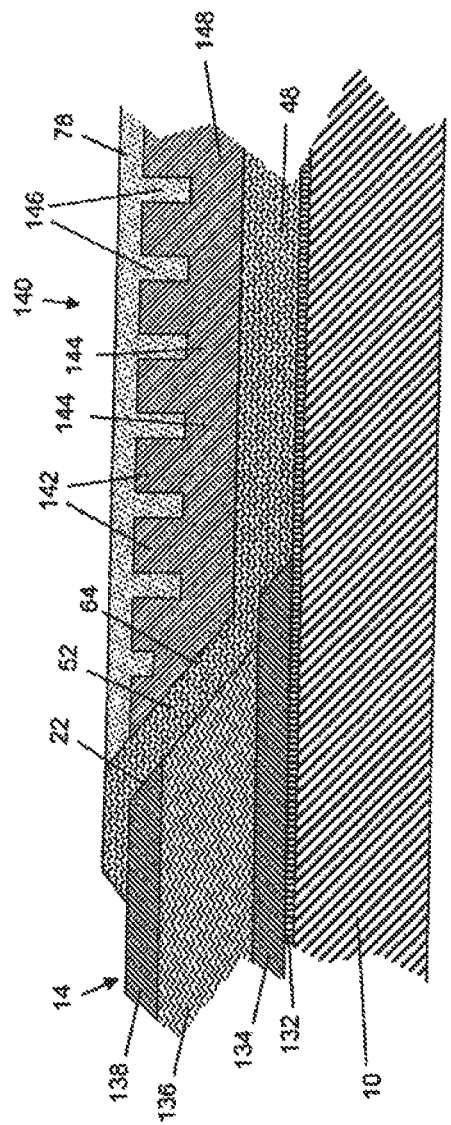

FIELD JOINT ARRANGEMENT FOR A PIPELINE AND PROTECTING METHOD THEREOF

This invention relates to coated pipelines and in particular to insulating inserts or infills for field joints of coated rigid pipelines, as used in the subsea oil and gas industry.

Rigid subsea pipelines are commonly formed of lengths of steel pipe—'pipe joints'—that are welded together end-to-end. Pipe joints are typically about 12 m in length but may be manufactured in multiples of that length, such as double, triple or quadruple pipe joints. To mitigate corrosion of the pipeline and to insulate the fluids that the pipeline carries in use, pipe joints are pre-coated, when manufactured, with protective and thermally-insulating parent coatings.

In many cases, pipe joints are welded together offshore aboard an installation vessel as a rigid pipeline is laid, typically by S-lay or J-lay methods. It is also common to fabricate pipe stalks of a length of 500 m to 1500 m from pipe joints onshore at a spoolbase or yard and then to weld together the pipe stalks end-to-end to spool the prefabricated rigid pipeline onto a reel. The spooled pipeline is then transported offshore for laying in a reel-lay operation. When spooling, bending of the pipeline extends beyond elastic limits into plastic deformation that must be recovered by subsequent straightening processes during unspooling when laying the pipe offshore.

It is important to understand that in the subsea oil and gas industry, the terms 'rigid' and 'flexible' as applied to pipes have clear meanings that differ in important respects from general language. For example, nominally 'rigid' pipes have enough flexibility to be bent minimum bend radius is observed. Yet, such pipes are not regarded in the industry as being 'flexible'.

Flexible pipes used in the subsea oil and gas industry are specified in API (American Petroleum Institute) Specification 17J and API Recommended Practice 17B. The pipe body is composed of a composite structure of layered materials, in which each layer has its own function.

The structure of a flexible pipe allows a large bending deflection without a similarly large increase in bending stresses. The bending limit of the composite structure is determined by the elastic limit of the outermost plastics layer of the structure, typically the outer sheath, which limit is typically 6% to 7% bending strain. Exceeding that limit causes irreversible damage to the structure. Consequently, the minimum bending radius or MBR of flexible pipe used in the subsea oil and gas industry is typically between 3 and 6 metres.

Conversely, rigid pipes used in the subsea oil and gas industry are specified in API Specification 5L and Recommended Practice 1111. In contrast to flexible pipes, a rigid pipe usually consists of or comprises at least one pipe of solid steel or steel alloy. However, additional elements can be added, such as an internal liner layer or one or more outer coating layers. Such additional elements can comprise polymer, metal or composite materials. Rigid pipe joints are typically terminated by a bevel or a thread, and are assembled end-to-end by welding or screwing them together.

The allowable in-service deflection of rigid steel pipe is determined by the elastic limit of steel, which is around 1% bending strain. Exceeding this limit caused plastic deformation of the steel. It follows that the MBR of rigid pipe used in the subsea oil and gas industry is typically around 100 to 300 metres depending upon the cross-sectional dimensions of the pipe. However, slight plastic deformation can be recovered or rectified by mechanical means, such as straightening. Thus, during reel-lay installation of a rigid pipeline made up of welded pipe joints or pipe stalks, the rigid pipeline can be spooled on a reel with a typical radius of between 8 and 12 metres. This implies a bending strain above 2% for conventional diameters of rigid pipes, requiring the pipeline to be straightened mechanically upon unspooling.

Thermal insulation is an important requirement for many subsea pipelines, especially those used to transport crude oil from subsea wellheads. As collected at the outlet of a wellhead, crude oil is a viscous, multiphasic, pressurised fluid at an elevated temperature, typically around 100° C. to 180° C. If the crude oil is allowed to cool to a significantly lower temperature, typically below 30° C., some components of the crude oil may solidify by mechanisms such as coalescence, precipitation or gelling. The waxes, asphaltenes, hydrates or other solid condensates that appear as a result may clog the pipeline and are difficult to remove. Similar issues may arise in subsea pipelines used to transport natural gas.

Polypropylene (PP) is most commonly used as the parent coating of pipe joints from which pipelines are fabricated. For example, a three-layer PP (3LPP) coating comprises a first layer of epoxy primer, a second thin layer of PP bonded to the primer and a third, thicker layer of extruded PP applied over the second layer. A five-layer PP (5LPP) coating adds two further layers, namely a fourth layer of PP modified for thermal insulation, such as glass syntactic PP (GSPP) or a foam, surrounded by a fifth layer of extruded PP for mechanical protection of the insulating fourth layer. Similar additional layers are possible for further thermal insulation, as in a seven-layer PP (7LPP) coating.

A short length of pipe eft uncoated at each end of a pipe joint to facilitate welding to abutting pipe joints. After welding, the resulting field joint comprises two bare steel pipe ends of the abutting pipe joints and the circumferential planar butt weld that joins those pipe joints together. Consequently, the field joint defines a gap in the parent coating that was applied to the pipe joints when they were manufactured. The end edges of the parent coatings are typically cut back with a tapering angle, typically from 30° to 45°, to define frusto-conical chamfers that lie in mutual opposition about the plane of the weld.

Once the weld between abutting pipe joints passes testing, the field joint must be coated with a field joint coating to mitigate corrosion and to maintain the necessary degree of insulation. Thus, the field joint coating fills the gap in the parent coating. In this respect, it is important that pipelines are covered by continuous thermal insulation extending across the field joints between the successive pipe joints. Otherwise, cold spots may arise that could promote clogging of the pipeline by solid condensates.

A further design constraint of reel-lay pipelines is that the outer diameter of the field joint coating must be similar to the outer diameter of the parent coatings on the adjacent pipe joints. Otherwise, the pipeline will be unable to pass through reeling and straightening equipment or will experience excessive localised stress when doing so.

Field joint coatings may be applied by a casting technique using thermoset materials such as polyurethane (PU) that cure and harden by cross-linking, or by an injection-moulding technique using molten thermoplastic materials such as PP that harden by cooling.

In a cast-moulded PU (CMPU) process, an example of which DE 102007018519, the exposed pipe surface at the abutting welded ends of the pipe joints is cleaned and a primer is applied. A mould is then positioned to enclose the field joint and a two-component urethane material is cast into the annular cavity defined within the mould around the held joint. The urethane then cures, cross-linking and solidifying to form PU in an irreversible chemical reaction. When the PU has cured sufficiently, the mould is removed to leave the field joint coating in piece around the field joint.

Another approach is to use PP as the field joint coating in an injection moulded polypropylene (IMPP) process. An example of an IMPP process is disclosed in earlier patent application published as WO 2012/004665.

In an IMPP process, the exposed pipe surface at the abutting welded ends of the pipe joints is cleaned, primed and heated, for example using induction heating or gas flames. The exposed chamfers at the adjacent ends of the parent coatings are also heated to soften them, for example using infra-red heating. The field joint is then enclosed by a mould that defines an annular cavity around the field joint. Molten PP is injected into the cavity under high pressure. Once the PP has cooled sufficiently, the mould is removed, leaving a tube of PP around the field joint as the field joint coating. This tube is continuous with the tubular parent coating surrounding the pipe joints, such that the same or compatible coating materials extend all along the length of the pipe string.

A field joint coating of IMPP is advantageous because it has broadly similar mechanical and thermal properties to a parent coating of PP. Also, the parent coating and the field joint coating are sufficiently compatible that they fuse together at their mutual interface, resisting cracking and hence giving longer service life. The service temperature of PP is also markedly higher than PU.

In the S-lay method, a pipeline is welded from pipe joints along a horizontal firing line. The pipeline is launched from the vessel over a stinger that supports an overbend of the pipeline, from which the pipeline curves down through the water to a sag bend leading to a touchdown point on the seabed. Field joint coating is carried out upstream of the stinger, at one or more coating stations through which the pipeline is advanced in stepwise fashion after welding.

Field joint coating is also employed during J-lay installation, in which pipe joints are lifted into a near-vertical orientation in a tower for welding to the end of the pipeline. The pipeline hangs near-vertically from the vessel and extends downwardly to a sag bend leading to a touchdown point on the seabed. Field joint coating is carried out downstream of the welding station in the tower, just before launching a newly-added pipe joint into the sea.

In principle, S-lay allows faster pipelaying thran J-lay but J-lay is necessary in challenging situations where, for example, the subsea environment is congested or water depth and strong currents make S-lay impractical without imparting large strains to the pipeline.

The speed of spooling and pipelaying depends upon minimising the timescale of all operations on the critical path. Given the stepwise, sequential processing steps of welding and field joint coating in S-lay and J-lay methods, it is particularly important that neither welding nor field joint coating take longer than is necessary or that one process takes substantially longer than the other. Otherwise there will be a 'bottleneck' in the pipeline installation process. Similar considerations apply to fabricating a pipeline that is to be spooled for reel-lay.

Moulding a thick field joint coating is among the slowest operations that must be performed during stepwise fabrication of subsea pipelines, especially if it is preceded by infra-red heating of the chamfers at the same workstation. Indeed, heating the chamfers and moulding a field joint coating may together define the cycle time for offshore pipeline fabrication using S-lay and J-lay techniques, including welding and non-destructive testing (NDT) operations. Accelerating the slowest operation is the key to reducing the overall cycle time, hence to increase the speed of pipeline laying.

Similarly, when fabricating pipelines for reel-lay, field joints formed between the successive pipe joints and pipe stalks must be coated before spooling. Thus, welding and field joint coating operations also lie on the critical path for fabricating pipe stalks and for spooling. In this respect, spooling can only take place after a pipe stalk has been welded correctly onto the end of the already-spooled length of pipeline and the resulting field joint has been coated. It follows that delays in welding and field joint coating operations may also affect reel-lay operations, specifically the time that is required to load a pipeline onto a reel-lay installation vessel when that vessel visits a spoolbase.

In any technique for laying rigid pipe, it will be clear that delays in fabricating the pipeline and applying field joint coatings will tie up a valuable capital asset in the form of an installation vessel that may be worth hundreds of millions of US dollars. Delays also increase operational costs of the vessel that may accumulate at a rate of hundreds of thousands of US dollars per day. Delays also risk missing a weather window during which the pipeline can be laid in a satisfactory sea state, which could delay entire subsea installation project at even greater expense.

As delays may arise while waiting for chemical curing of a thermoset material or for physical cooling of a thermoplastic material to solidify a field joint coating, various prior art proposals present solutions to quicken this hardening step. For example, one of the measures proposed in the aforementioned WO 2012/004665 is to place an insert into the gap between the parent coatings of abutting pipe joints before injecting molten thermoplastics material into a mould placed around that gap, hence to embed the insert. The insert is a pre-fabricated shell or assembly of thermally insulating material, which may be applied to the pipeline offline as soon as the butt weld of that field joint has been tested. The insert reduces the volume of molten thermoplastics material to inject, mould or cast and hence to cool down, thus reducing injection and cool-down time. This provides a substantial gain in terms of cycle time and helpfully reduces the footprint of the equipment. It also improves mechanical properties because internal stresses and strains related to material shrinkage following injection or casting can be reduced significantly.

It will be apparent that whether S-lay, J-lay or reel-lay methods are employed to lay a rigid pipe, the pipeline—including each of its successive field joint coatings—will experience substantial stresses and strains. Stresses and strains are experienced a a pipeline is laid, for example due to thermal cycling in use. However, stresses and strains are particularly prevalent before and during laying as the pipeline is deflected onto a reel, over an overbend or through a sag bend, as the case may be, during spooling or laying. The stresses and strains are most severe when spooling a coated pipeline onto a reel, which as mentioned above involves plastic deformation of the steel of the rigid pipe. The reel acting as a bending mandrel also imparts concentrated deformation forces directly to the coating that act through the coating on the underlying steel pipe.

When a pipeline undergoes substantial bending, cracks will tend to appear and debonding will tend to occur at the interfaces between field joint coatings and parent coatings.

The presence of an insert adds further interfaces and may increase the number of local stress and strain concentrations within the field joint coating, which increases the risk of cracks appearing. Any such cracks may allow water to reach the outer surface of the steel pipe, thus corroding the pipe. Water ingress may also reduce the adhesion of PU coatings to the pipe and may additionally degrade the coatings themselves. An example of such degradation is hydrolysis of a PU field joint coating under heat emanating from within the pipeline in use, which is particularly significant under the high-pressure conditions of deep water. Degradation or loss of adhesion of the coatings will tend to lead to a failure of thermal insulation and to permit further corrosion of the pipe.

The insert proposed in WO 2012/004665 requires injection of additional material to fill in the gaps left after the insert has been positioned. Filling in the injected material below the insert may be difficult to achieve. This challenge is addressed by providing channels or bores through, around or under the insert so that molten PP can flow from the outer gap between the mould wall and the insert to the inner gap between the insert and the pipe wall. However this complicates the shape of the insert and increases moulding or injection time. The insert design requires careful attention to allow the injected PP to flow around the insert, as flow paths can be limited and re-welding lines must be avoided in case they create points of weakness in the field joint coating. Also, any cavities left in a field joint coating will concentrate stress and may lead to failure of the coating in subsea service, noting that such coatings typically have to withstand enormous hydrostatic pressures after installation of a pipeline at depth.

When overmoulding an insert as in WO 2012/004665, another challenge centre the insert in the mould cavity between the pipe and the mould wall. In practice, the mould may need to be equipped with retractable pins to maintain gaps under and over the insert. Those gaps ensure that the molten PP will fill the cavity and bond to the pipe, the insert and the parent coatings, hence ensuring continuity of thermal insulation across the field joint.

WO 03/095887 also teaches pre-inserting and fastening solid shell elements around the field joint before injecting material. Again, a challenge here, is to achieve sufficient quality of injection below the solid elements.

GB 2520717 describes placing solid thermoplastic shell elements around a field joint before heating the shell elements thin a mould cavity. Thermal expansion of the shell elements is constrained within the mould cavity during heating in order to apply elevated pressure between the shell elements and the pipeline.

Insulating or protective half-shells of plastics for pipelines are disclosed in EP 2302277, for example. Such half-shells may be known in the art as doghouses. Conventional protective half-shells such as these are not designed to ensure a perfect interface with the pipes inside them. Consequently, they leave voids at the interfaces, which renders them unsuitable for use in field joint coatings for subsea pipelines.

U.S. Pat. No. 8,506,735 describes coating a pipe using half-shell-shaped insulation blankets that are covered by a protective jacket after installation. However this is not relevant to the production of thermal insulation coatings, especially field joint coatings, because of the gaps and voids that remain after installation.

WO 2012/172451 describes a method of applying protective polymer sheeting to a cut-back on a pipeline by continuously extruding polymer material from a carriage as the carriage advances along an annular path around the pipeline.

A field joint coating comprising successive layers or sleeves is known from U.S. Pat. No. 3,744,823, which discloses a pipeline for carrying very hot fluids such as molten sulphur. Again, the use of such a structure for subsea pipelines precluded because gaps and voids are likely to exist between the layers.

The present invention seeks to reduce the time required to produce robust field joint coating that will resist cracking during reeling, installation and use of the pipeline.

Against this background, the invention resides in a method of protecting a field joint of a pipeline at which chamfered edges of thermally-insulating parent coatings on conjoined pipe lengths are in mutual opposition about a longitudinally-extending gap. The method of the invention comprises: manufacturing an hourglass-shaped inner layer around the pipe lengths, which layer extends longitudinally along the gap between the chamfered edges and at least partially overlies the chamfered edges; assembling a thermally-insulating solid insert from two or more parts to lie in the gap surrounding the inner layer; applying radially-inward pressure from the insert to the inner layer; and manufacturing an outer layer around the insert using molten material to form a watertight barrier and to form one or more melted interfaces with the inner layer.

The inner layer may be elastically compressed or plastically deformed by said radially-inward pressure. For example, where the inner layer is a thermoplastic, the insert may be pressed into the inner layer when the inner layer is at a softening temperature.

The radially-inward pressure on the layer is preferably maintained during and after manufacturing the outer layer. This may be achieved by holding together the parts of the insert under tension in one or more fastenings that connect those parts. For example, the parts of the insert may be held together by one or more straps under tension, by one or more clips under resilient tension, or by engagement of barbs of one of those parts with holes of another of those parts, that engagement maintaining resilient deflection of the parts to keep the barbs under tension.

Conveniently, the parts of the insert may be press-fitted together to engage the fastenings and to apply radially inward pressure to the inner layer. For example barbs may be an interference force-fit within the holes.

An anti-corrosion layer and an adhesive primer layer are suitably applied onto the pipe lengths before manufacturing the inner layer.

The inner layer is preferably moulded around the joined pipe lengths but could instead be wound or wrapped around the joined pipe lengths. Similarly, the inner layer is preferably moulded around the insert but could instead be wrapped around the insert For example, the inner layer or the outer layer could be extruded in situ.

The inventive concept also finds expression in a field joint arrangement for a pipeline. That arrangement comprises: pipe lengths joined end-to-end at a joint; thermally-insulating parent coatings on each of the pipe lengths, the parent coatings having chamfered edges that are spaced from the joint in mutual opposition about a longitudinally-extending gap; and an annular field joint coating. In accordance with the invention, that coating comprises: an hourglass-shaped inner layer that surrounds the pipe lengths, extends longitudinally along the gap between the chamfered edges and has inclined end parts that at least partially overlie the respective chamfered edges; a thermally-insulating solid insert disposed in the gap, the insert being made up of two or more parts that cooperate to surround the inner layer; and an outer layer surrounding the insert that forms a watertight barrier and has one or more melted interfaces with the inner layer.

To reduce stress in the field joint during bending, the insert of a softer material than the inner layer.

The insert and the inner layer suitably cooperate to fill the longitudinally-extending gap between the chamfered edges of the parent coatings. For this purpose, the insert may have end faces inclined to lie closely against the end parts of the inner layer. Alternatively, there may be gaps between end faces of the insert and the end parts of the inner layer, which gaps are fined by material of the outer layer.

The end parts of the inner layer may extend longitudinally beyond the outer layer, which seals against the end parts of the inner layer at melted interfaces. Preferably, however, the outer layer extends longitudinally beyond the end parts of the inner layer to bond to the parent coatings outboard of melted interfaces with the end parts of the inner layer. Nevertheless, it is possible for the outer layer to bond to the chamfers of the parent coatings.

The end parts of the inner layer may extend longitudinally beyond the chamfered edges to bond to radially outer surfaces of the parent coatings. Alternatively, the end parts of the inner layer may terminate on the chamfered edges, radially inwardly with respect to radially outer surfaces of the parent coatings.

The end parts of the inner layer may terminate radially inwardly with respect to a radially outer surface of the insert. Alternatively, the end parts of the inner layer may extend radially outwardly beyond a radially outer surface of the insert.

A radially outer surface of the insert suitably lies at substantially the same radius as radially outer surfaces of the parent coatings.

It is possible for the end parts of the inner layer to terminate radially at substantially the same radius as a radially outer surface of the outer layer.

The chamfered edges may each comprise at least one coinciding with a boundary between layers of the parent coatings. For example, an inner layer of each parent coating may protrude longitudinally into the gap from the chamfered edge. It is also possible for the end parts of the inner layer to extend into spaces defined by cutting back an outer layer of each parent coating from the chamfered edge.

To facilitate bending, the insert may comprise a longitudinal series of segments alternating with relatively flexible links. For example, the links may be relatively thin parts of the insert leaving gaps between the segments on a radially outer of links, which gaps are filled by material of the outer layer.

Preferably, the inner and the outer layers each have a thickness of between one sixth and one quarter of the aggregate thickness of an assembly comprising the inner layer, the insert and the outer layer. It is also preferred that the insert has an overall thickness of between one half and two thirds of the aggregate thickness of that assembly.

The inventive concept also encompasses a subsea pipeline comprising at least one field joint arrangement of the invention.

In specific embodiments, the invention provides a thermally-insulating field joint coating that comprises, in radially outward succession:

a primer layer, which is typical of an adhesive on a corrosion-resistant coating of FBE;
an hourglass-shaped thermally-insulating inner coating layer;
a solid insert comprising at least two cooperating thermally-insulating shells; and
a watertight outer cover layer.

The hourglass-shaped layer may comprise a tape, a wrap or a sleeve, or may be moulded in place, for example by injection moulding. The hourglass-shaped layer may, for example, be between 10 mm and 25 mm thick and may be of any suitable coating material, even possibly FBE although preferably of moulded plastics.

The solid insert preferably compresses the hourglass-shaped layer. The hourglass-shaped layer may be softer than the insert upon assembly, for example by being heated to a softening temperature at that time. Preferably, however, the material of the insert is softer than the material of the hourglass-shaped layer at the temperatures that typically prevail during spooling, straightening or installation. This reduces stress in the field joint coating as the underlying pipeline bends.

The insert and the hourglass-shaped layer suitably cooperate so as totally to fill the volume of the gap defined by cut-backs of the parent coatings.

Shells of the insert suitably comprise at least one positioning provision and at least one locking pin. The locking pin may engage a bore in a cooperating shell of the insert, and could comprise a ratchet. Shells of the insert may be strapped together.

The outer cover layer preferably of moulded polymer be a tape, wrap or sleeve.

In a specific example, the invention provides a method for manufacturing a field joint coating, comprising:

preparing the field joint for coating, after welding;
applying a primer layer such as that described above;
manufacturing an hourglass-shaped layer that covers all of the pipe surfaces of the field joint region between the chamfers of the parent coatings and that extends to cover the chamfers, at least partially;
positioning at least two cooperating thermally-insulating insert shells around the hourglass-shaped layer;
pressing the shells against each other and/or against the hourglass-shaped layer;
engaging at least one permanent locking device between the shells;
releasing inward pressure exerted on the shells; and
manufacturing a water cover layer around the shells and the ends of the parent coatings.

The invention combines partial moulding of a field joint coating, preferably involving IMPP, with the addition of a solid but potentially still flexible insert. The insert is then covered with a watertight outer layer.

The thickness of the first, hourglass-shaped inner layer is a trade-off between cooling time and the efficiency of thermal insulation. The thinner the inner layer, the better to minimise cooling time. However, a thicker inner layer is better for thermal insulation. A typical optimised value for the thickness of the inner layer is one sixth to one quarter of the overall thickness of the parent coating. For example, the thickness of the inner layer may be about 15 mm to 25 mm if the thickness of the parent coating is between 75 mm and 100 mm.

The inner layer is preferably moulded to optimise bonding with both parent coatings and with the underlying pipe joints, although a tape could be used to make the inner layer instead.

Assembling part-tubular parts of the insert such as half-shells around the field joint creates a radially-inward pressure that compresses the inner hourglass layer. This inward pressure eliminates gaps between the inner layer and the underlying pipe joints and between the inner layer and the insert. Assembly and application of insert parts such as half-shells could be automated.

An outer layer such as a jacket or sleeve is required to ensure continuity of the global coating system, comprising the parent coating and the field joint coating, that protects the pipe from sea water. That layer is preferably moulded to optimise bonding with both parent coatings, the insert and the inner layer, although again, a tape or a wrap could be considered for the outer layer instead.

In a first step, a field joint is coated with a simple hourglass-shaped injection-moulded inner layer of PP with a thickness of about 10 mm to about 25 mm maximum, this being about one sixth to one quarter of the overall thickness of the full field joint coating.

The next step, immediately after moulding the inner layer, is to fit the insert at the same workstation or at the next workstation. Here, the PP of the hourglass-shaped insert is still soft but no longer molten. For this purpose, part-tubular insert parts such as two half-shells are assembled around, and pressed radially inwardly into, the inner layer, which flows plastically to conform closely to the inner side of the insert. The thickness of the insert is around one half to two thirds of the overall thickness of the full field joint coating.

The final step is an overcoating of solid PP as an outer layer around the insert to a thickness about one sixth to one quarter of the overall thickness of the field joint coating, typically about 10 mm to 15 mm. This preferably involves overmoulding of molten PP in a mould under pressure. It may instead be possible to apply a side wrap melted PP film around the insert with equivalent total thickness.

The invention allows the same mould tool to be used or mainline and field joints. Previously, mainline field joints have been made with thick layer of IMPP and tie-in field joints have been made with a thinner hourglass-shaped layer of IMPP. In contrast, the same hourglass mould tool can be used for both mainline and tie-in field joints, reducing the overall cost.

By virtue of the invention, the insert can be simpler in shape than in the prior art and does not require a complex mould with retractable pins, as there is no possibility of the insert moving within the mould cavity. Part-tubular insert parts such as two half-shells can simply be positioned over and pressed against the still-soft moulded hourglass-shaped inner layer in close contact, thus achieving a proper bond between the insert and the hourglass-shaped moulding.

Easy positioning and adjustment of the insert relative to the hourglass-shaped inner layer is achieved by virtue of the geometry of the outer surface of the hourglass shape and the precision allowed by the IMPP process, which can achieve less than 0.1 mm tolerance. The insert can be injection moulded or machined with corresponding precision.

The simple application of the half shells and their engagement with the hourglass-shaped inner layer allows intimately close contact between them. There is useful contact pressure over the whole contact surfaces of the radially inner surface of the insert and the radially outer surface of the inner layer.

Manufacture of the inserts or their part-tubular parts can be performed in parallel before field joint fabrication. Depending on the thickness of the inserts, they can be made by injection moulding in one or more steps. For example, if the thickness of an insert is greater than about 30 mm, a preform of 50% to 60% of the total thickness required can be moulded and then the remaining volume of the insert can be overmoulded on the preform to reduce shrinkage and to improve manufacturing tolerances. A surface profile or texture can be applied to the insert to improve mechanical bonding with the inner hourglass-shaped layer under the insert and with the outer layer produced by overmoulding or applied by tape or side wrap PP on top of the insert.

In order that the invention may be more readily understood, reference will now be made, by way of example, to the accompanying drawings in which:

FIG. 6 is an enlarged schematic perspective view of an end of a half-shell being part of an insert in accordance with the invention;

FIG. 7 is a schematic sectional detail view of two of the half-shells of FIG. 6 being assembled to make an insert;

FIG. 8 is a schematic perspective view of an insert in accordance with the invention made from two of the half-shells shown in FIGS. 6 and 7;

FIGS. 22a and 22b are schematic enlarged detail side views of a further variant of the invention, in which the insert is adapted for increased longitudinal flexibility.

Figure 1:
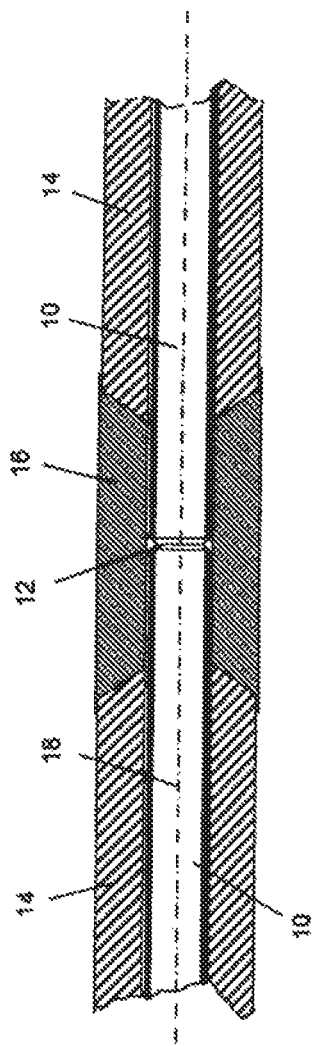
FIG. 1 is a schematic sectional side view of a coated field joint of a pipeline as known in the prior art.

In the prior art arrangement shown in FIG. 1, a field joint is created between abutting pipe joints 10 of a pipeline, where a circumferential butt weld 12 attaches the pipe joints 10 to each other end-to-end. The pipe joints 10 could be double, triple or quadruple pipe joints manufactured in multiples of the standard length of about 12 m. Similarly, one or both of the pipe joints 10 could be at an end of a much longer pipe stalk comprising numerous pipe joints 10 joined end-to-end.

Each pipe joint 10 is coated with an insulating parent coating 14, for example a 5LPP coating, which terminates short of the facing end of each pipe joint 10 with a typically chamfered end shape as shown. The thickness of the parent coatings 14 is somewhat exaggerated in this schematic view for clarity.

An annular gap lies between opposed chamfered ends of the parent coatings 14 around the weld 12. The exposed external surfaces of the pipe joints 10 are coated with an insulating field joint coating 16 that fills the gap and substantially matches the radial thickness of the adjacent parent coatings 14.

In this description, references to the radial direction are defined with respect to the common central longitudinal axis 18 of the abutting pipe joints 10, which is also the centre of curvature of the pipe joints 10, the coatings 14, 16 and other tubular or part-tubular features.

As acknowledged in the introduction, the field joint coating 16 is apt to be made using a mould tool fixed around the field joint. The mould tool extends from one parent coating 14 to the other parent coating 14 and overlaps them. This defines a mould cavity that includes the annular gap between the coatings 14 and that surrounds the field joint. A liquid polymer such as PP is injected or otherwise introduced into the mould cavity to harden in the mould cavity before the mould tool is removed to coat another field joint of the pipeline. Mould tools suitable for producing a field joint coating 16 are described in more detail in our aforementioned International patent application published as WO 2012/004665.

Injection-moulding of thermoplastics is preferred in the prior art and for the purposes of the invention—especially when combined with the teachings of WO 2012/004665, such as sequential cascade injection. However, the invention is not confined to that possibility. For example, cast moulding of a thermoset field joint coating such as PU is also possible.

Figure 2:
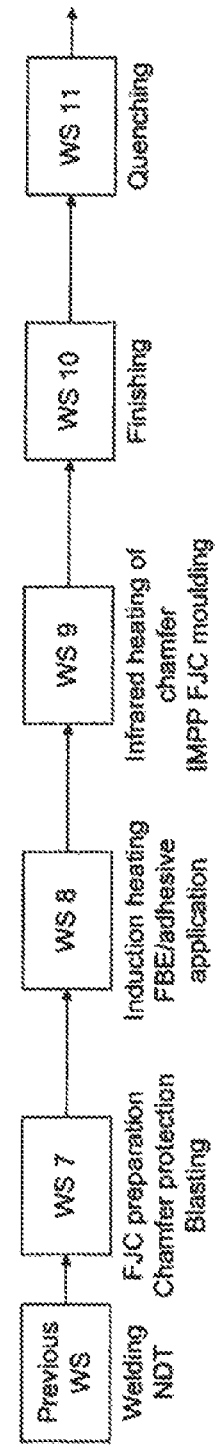
FIG. 2 is a flow diagram that expresses a prior art method of producing the field joint coating of FIG. 1.

FIG. 2 is a flow diagram that expresses the prior art method of producing the field joint coating of FIG. 1. FIG. 2 illustrates that method in the context of successive workstations (abbreviated here as 'WS'), which may be spaced from each other by the length of a pipe joint 10 along the firing line of a spoolbase or of a pipelay vessel configured for S-lay operations.

To save time, different operations take place simultaneously on successive field joints of a pipeline at the various workstations. The pipeline is advanced in stepwise fashion along the firing line from one workstation to the next as soon as all operations have been completed at the respective workstations. Consequently, all of those operations lie on the critical path, meaning that any of those operations has the potential to delay the entire pipeline fabrication, installation or spooling process if that operation takes too long to complete.

FIG. 2 abbreviates the firing line to focus upon the operations that are most relevant to field joint coating. Thus, various preceding operations such as bevelling and alignment of pipe joints, weld preparation, welding and NDT of the weld, which are typically performed at up to six workstations, are designated together in FIG. 2 as 'Previous WS'.

After NDT of the weld, the field joint is moved to WS 7. There, preparation for field joint coating is performed by protecting the chamfered ends of the parent coatings 14 and then blasting the exposed external surfaces of the abutting pipe joints 10.

The pipeline is then advanced to bring the field joint to WS 8, where the exposed ends of the abutting pipe joints 10 are heated, for example by induction heating, and a layer of adhesive such as fusion-bonded epoxy (FBE) is applied to them as a primer.

When the field joint is advanced to WS 9, the chamfered ends of the parent coatings 14 are heated by radiant infra-red heaters to soften them and the field joint coating (FJC) is produced from injection-moulded PP (IMPP).

At WS 10, an optional protective finishing layer is applied around the field joint coating by, for example, painting, overmoulding or applying a tape or sleeve.

Finally, quenching may take place at WS 11 to cool and solidify the field joint coating quickly. The field joint is then ready for further steps, if the firing line is on a pipelay vessel, those steps may involve being launched with the adjoining pipe joints 10 into the sea. If the firing line is at a spoolbase, those steps may involve spooling onto a reel.

Moving on now to field joint coating techniques of the invention, reference is made firstly to FIGS. 3a to 5 of the drawings.

FIGS. 3a to 3j illustrate the execution of some, but not all, of the method steps of the invention. Like numerals are used for like parts. Whilst method steps that are not illustrated in FIGS. 3a to 3j will be familiar to those skilled in the art, they are nevertheless described briefly below for ease of understanding.

Figure 3A:
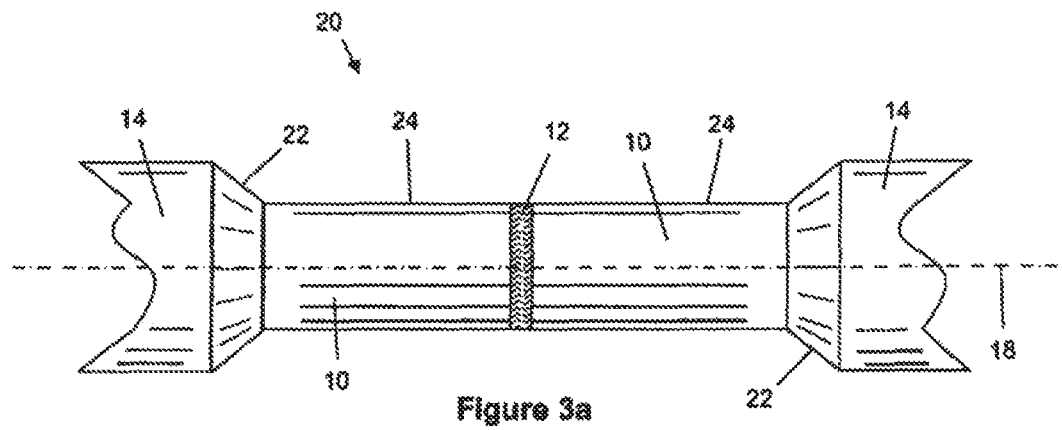
FIGS. 3a to 3j are a sequence of schematic side views that illustrate the execution of method steps for producing a field joint coating of the invention, including detail views of the application of an insert to an underlying inner layer of the field joint coating.
Figure 3B:
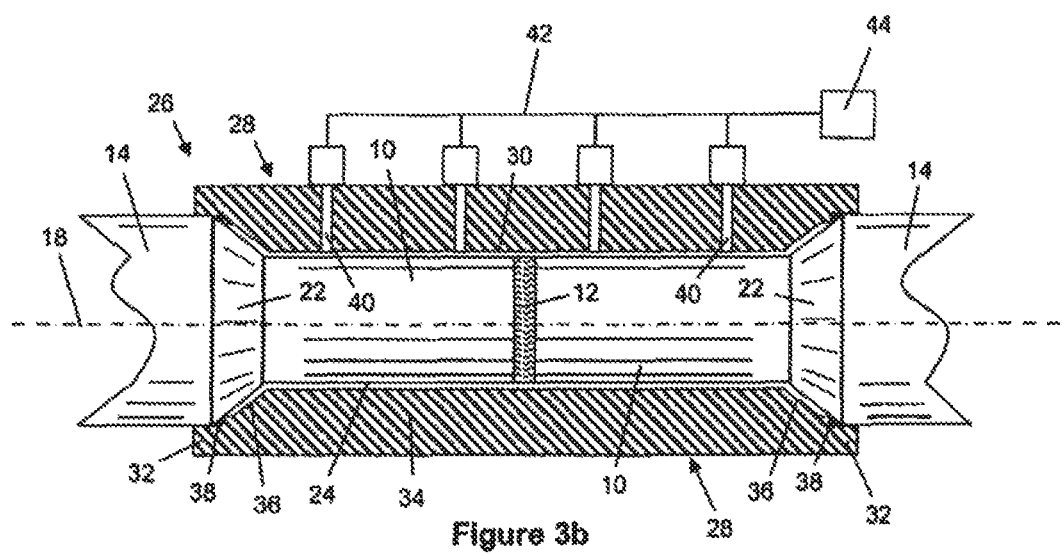
Figure 3C:
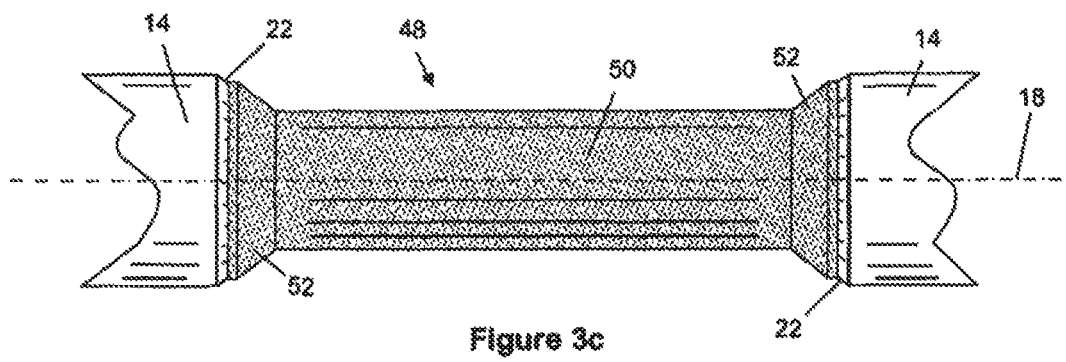
Figure 3D:
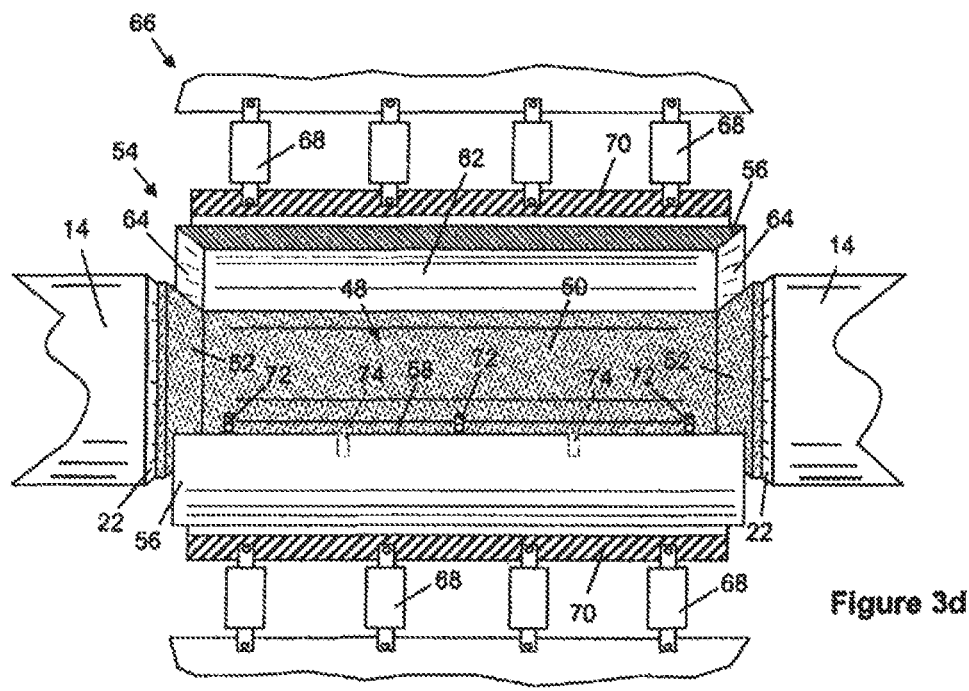
Figure 3E:
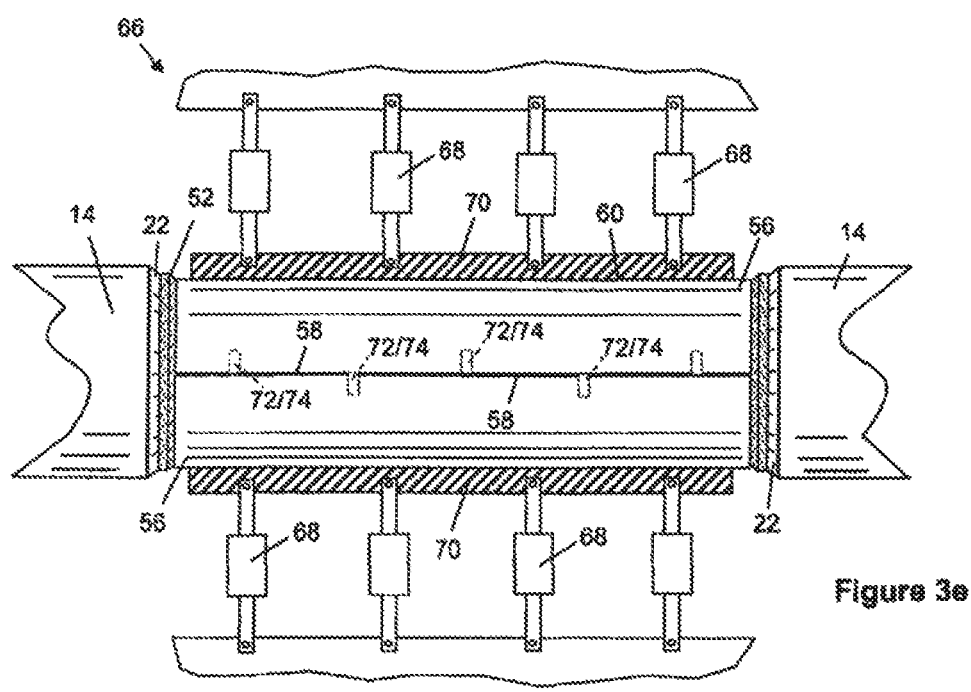
Figure 3F:
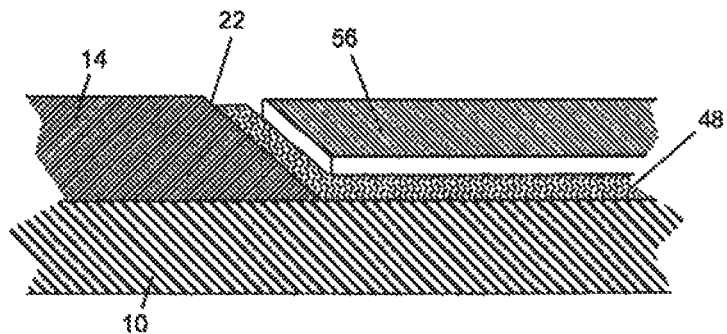
Figure 3G:
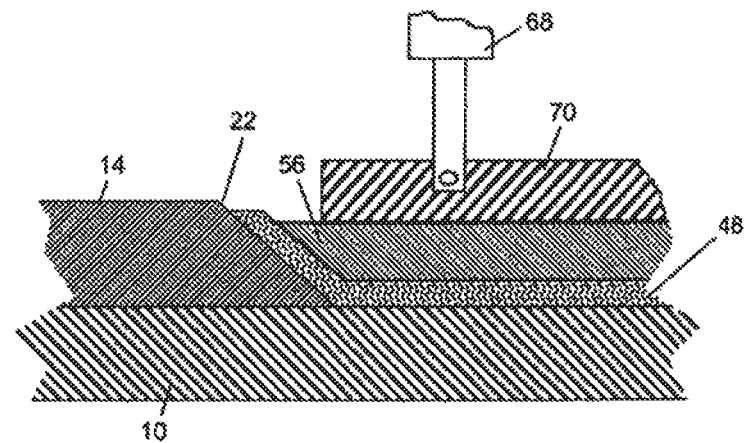
Figure 3H:
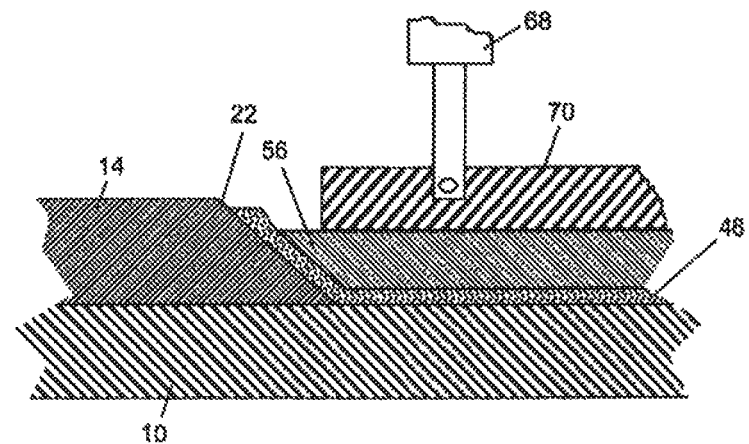
Figure 3I:
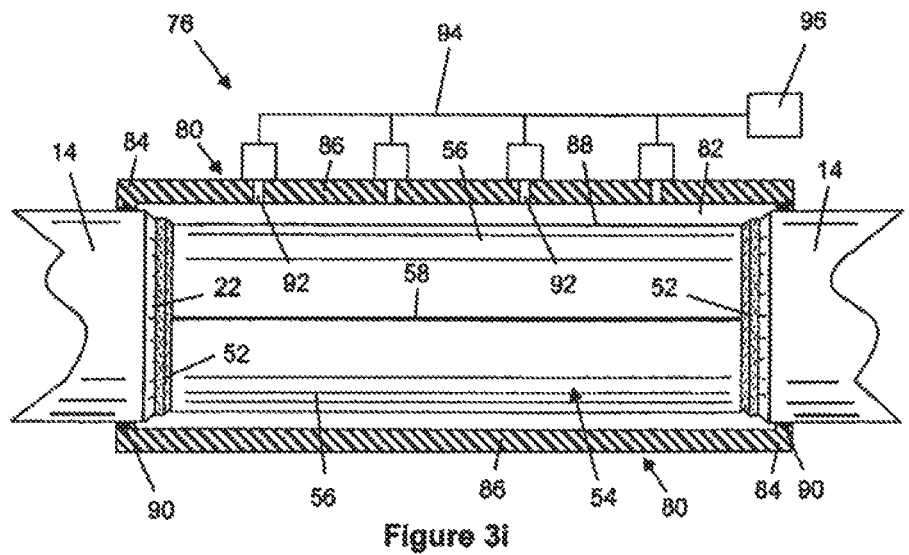
Figure 3J:
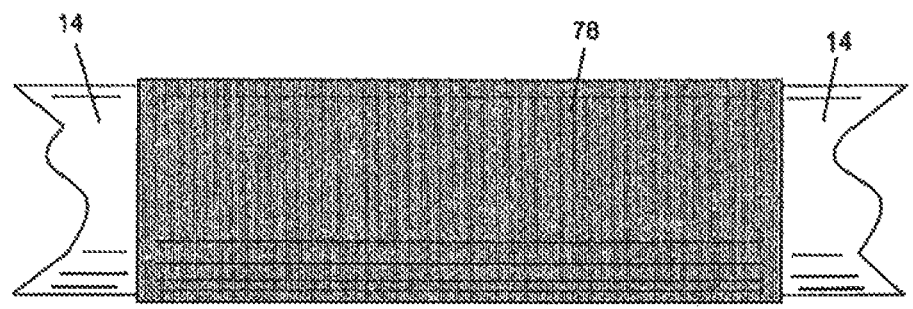
Figure 4:
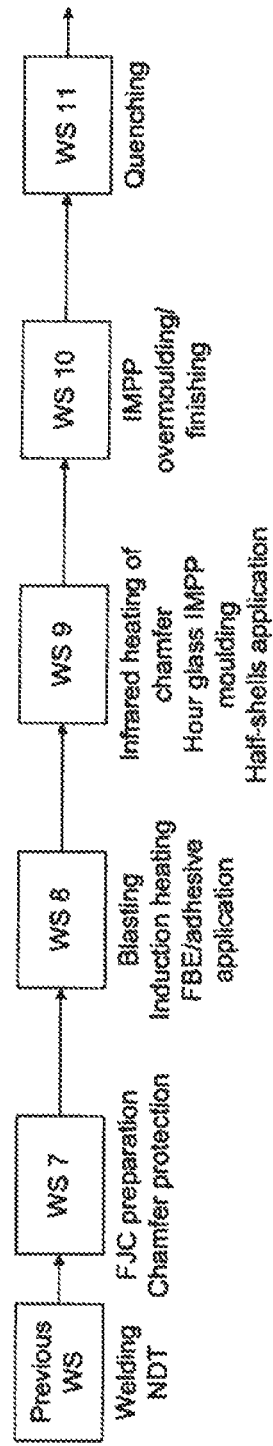
FIGS. 4 and 5 are flow diagrams that express methods of producing a field joint coating in accordance with the invention, as illustrated in FIGS. 3a to 3j.
Figure 5:
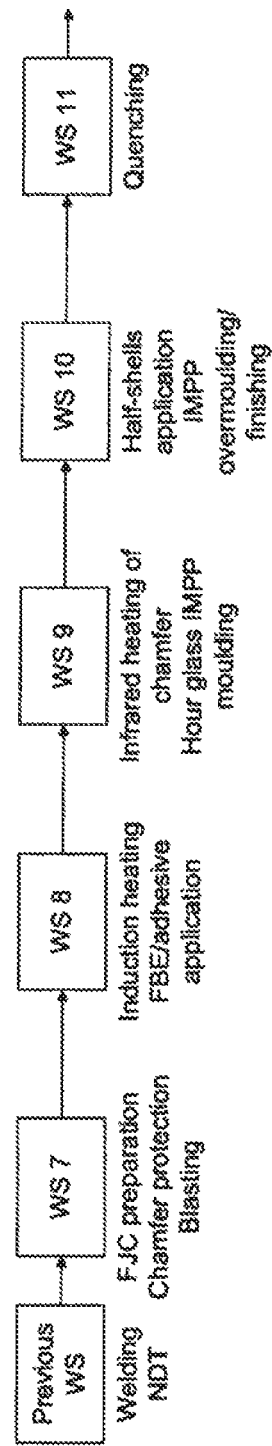

FIGS. 4 and 5 are flow diagrams that correspond to FIG. 2 but show variants of the method of the invention exemplified by FIGS. 3a to 3j. In those variants, method steps are performed in the same order as described with reference to FIGS. 3a to 3j but some of those steps are performed at different workstations, as will be explained.

FIG. 3a shows a field joint 20 created by a circumferential weld 12 between abutting pipe joints 10 of a pipeline. As in FIG. 1, each pipe joint 10 is coated with an insulating parent coating 14, for example a 5LPP coating. Each parent coating 14 terminates with a frusto-conical edge chamfer 22 where the parent coating 14 is cut back from the welded end of the associated pipe joint 10. This leaves exposed external surfaces 24 of the abutting pipe joints 10, ready for preparation by blasting after NDT has been performed on the weld 12 and the edge chamfers 22 have been suitably protected from the blasting process. All of the aforementioned features are rotationally symmetrical about the central longitudinal axis 18.

FIG. 5 shows that preparation, chamfer protection and blasting may be performed at WS 7, as in the prior art acknowledged in FIG. 2. However, FIG. 4 shows the alternative of deferring blasting until WS 8, if such deferral optimises the critical path.

FIGS. 4 and 5 show that the exposed external surfaces 24 of the pipe joints 10 are heated at WS 8, for example by induction heating or gas flame heating, and a layer of adhesive such as fusion-bonded epoxy (FBE) is applied to those surfaces 24 as a primer. Optionally, this is followed by infra-red heating of the edge chamfers 22 at WS 9. Next, a mould tool 26 shown in FIG. 3b is assembled around the heated field joint 20 from part-tubular mould parts 28. The mould parts are clamped together to hold the mould tool 26 in sealing engagement with the parent coatings 14 of the pipe joints 10 and to resist internal pressure within a mould cavity 30 defined by the mould tool 26.

FIG. 3b shows that the mould tool 26 comprises a tube of generally circular cross-section assembled around the field joint of FIG. 3a. In this example, the tube is divided longitudinally on a diameter of the cross-section into two halves 28 that seal against each other and against the parent coatings 14.

Opposed tubular end portions 32 of the mould tool 26 seat onto the outer surface of the parent coatings 14 and so have an internal diameter that substantially corresponds to the external diameter of the parent coatings 14. Conversely, a tubular central portion 34 between the end portions of the mould tool 26 has a relatively thick wall and a correspondingly small internal diameter, which is smaller than the external diameter of the parent coatings 14. Frusto-conical steps 36 at each end of the central portion extend between the central portion 34 and the end portions 32, with an inclination to the longitudinal axis that substantially matches that of the edge chamfers 22.

The internal diameter of the central portion 34 of the mould tool 26 is slightly greater than the external diameter of the exposed surfaces 24 of the pipe joints 10. This spaces the central portion of the mould tool 26 radially outwardly from the exposed external surfaces 24 of the pipe joints 10 to define the annular mould cavity 30 that encircles those external surfaces 24. The frusto-conical steps 36 are similarly spaced longitudinally inwardly from the respective edge chamfers 22. Thus, the mould cavity 30 also extends along the edge chamfers 22. The result is that the mould cavity 30 comprises flared frusto-conical end spaces extending parallel to the edge chamfers 22, at respective ends of a central tubular space that extends parallel to the external surfaces 24 of the pipe joints 10.

The mould tool 26 carries internal seals 38 between the central portion 34 and the respective end portions 32, at the radially outer ends of the frusto-conical steps 36. The seals 38 encircle the pipe joints 10 to define the longitudinal and radial extremities of the mould cavity 30. In this example, the seals 38 seal against the edge chamfers 22 of the parent coatings 14, near the radially outer edge of each edge chamfer 22. Thus, the mould cavity 30 extends partially along the edge chamfers 22, extending radially outwardly of the exposed external surfaces 24 of the pipe joints 10 but terminating radially inwardly of the outer surfaces of the parent coatings 14.

The tubular wall of the mould tool 26 is penetrated by one or more gates 40 for injection of a liquid polymer into the mould cavity 30, in this example molten PP, supplied through feed lines 42 under pressure from a supplying reservoir or machine 44.

FIG. 3c shop an injection-moulded inner layer 48 of a field joint coating of the invention, immediately after removal of the mould tool 26 shown in FIG. 3b. In this example, the inner layer 48 is of solid PP.

The inner layer corresponds to the shape and extent of the mould cavity 30 and so has a waisted shape known in the art as an 'hourglass'. This term is apt to describe a shape that comprises a slim or narrow waist 50, midsection or joining segment disposed between relatively wide end cones 52, all being rotationally symmetrical about the central longitudinal axis 18. The term is particularly apt where the end cones 52 have a taper whose inclination corresponds to the frusta-conical shape of the edge chamfers 22. Thus, the wider end cones 52 of the hourglass shape extend part-way along the edge chamfers 22 whereas the narrow waist 50 of the hourglass shape extends along the exposed external surfaces 24 of the pipe joints 10.

Moving on next to FIGS. 3d and 3e, these show, schematically, a tubular insulating insert 54 in accordance with the invention being assembled around the inner layer 48.

The insert 54 is preferably of substantially solid thermally-insulating material such as GSPP, solid PP, glass syntactic PU (GSPU) or solid PU. Whilst solid and substantially rigid, the insert 54 has sufficient inherent flexibility to bend with the underlying pipe joints 10 as the pipeline bends during reeling or installation and in use.

The insert 54 is fused with the inner layer 48 under radially-inward pressure, optionally with application of heat to the interface to melt or soften the materials. For example, parts of the insert 54 could be preheated before assembly around the inner layer 48.

The insert is exemplified in FIGS. 3d and 3e as being divided longitudinally on a diameter of its cross-section into two half-shells 56 that can abut each other along mutually-opposed side faces 58. Each half-shell 56 is shaped to extend around half of the circumference of the inner layer 48, such that the half-shells 56 form a hollow cylinder or tube when they are brought together around the inner layer 48. Thus, a combination of two opposed abutting half-shells 56 forms a tube that encircles the inner layer 48 which, in turn, surrounds the field Joint 20 as shown in FIG. 3e. Another example of such an insert is shown schematically in FIGS. 6 to 8, which will be described later.

FIG. 3d shows the half-shells 56 being brought together around the field joint 20 in longitudinal alignment with the annular gap between the opposed edge chamfers 22. One of the half-shells 56, which is uppermost in the drawings, is drawn in longitudinal section to show the internal shape of the half-shells 56. Conversely, FIG. 3d shows only the outer side of the other half-shell 56.

In FIG. 3e, the half-shells 56 have been brought together around the field joint come together along their opposed side faces 58 and hence to form the tubular insert 54. The insert 54 bridges the remainder of the gap between the opposed edge chamfers 22. There should be intimately close contact between the radially inner side of the insert 54 and the radially outer side of the inner layer 46. The radially inner side of the insert 54 is therefore shaped like the inner side of the mould tool 26 so as to match the radially outer side of the inner layer 48 that was created by the mould tool 26.

Specifically, the geometry of the insert 54 fits into a tubular volume in the shape of a thick-walled hollow cylinder. The insert 54 has a radially outer face 60 whose external diameter is preferably slightly less than, or substantially equal to, the external diameter of the parent coatings 14. In the example shown, the outer face 60 of the insert 54 lies radially within the radial extremity of the inner layer 48, as defined by the end cones 52 of the inner layer 48 that protrude longitudinally and radially from respective ends of the insert 54 as shown in FIG. 3e.

The insert 54 also has a radially inner face 62 whose internal diameter is substantially equal to, or slightly smaller than, the external diameter of the inner layer 48. Opposed ends 64 of the insert 54 have a hollowed frusto-conical concave profile to correspond to the opposed convex contour of the end cones 52 of the hourglass-shaped inner layer 48 that overlie the edge chamfers 22 of the parent coatings 14.

FIGS. 3d and 3e show the two half-shells of the insert 54 being forced together by radially-inward pressure. In this example, that pressure is exerted by a clamping apparatus 66 comprising double-acting hydraulic or pneumatic actuators 68 bearing on diametrically-opposed radially-movable reciprocating jaws 70. Extending the actuators 68 in an assembly stroke as shown in FIG. 3e moves the jaws 70 toward each other and hence forces together the two half-shells 56 of the insert 54 between the jaws 70. In this respect, FIG. 4 shows application of the half-shells 56 as the final operation at WS 9 whereas FIG. 5 shows application of the half-shells 56 as the first operation at WS 10.

When the actuators 68 retract in a return stroke, they pull the jaws 70 away from the assembled insert 54, allowing the insert 54 subsequently to be carried downstream by stepwise progress of the pipeline along the firing line. The jaws 70 are then loaded with fresh half-shells 56 ready for the assembly stroke to begin again, when assembling a further insert 54 around the next field joint 20 in the upstream direction. Thus, the next insert 54 can be assembled at the same workstation from further half-shells 56, upstream of the field joint 20 that carries the preceding insert 54.

Preferably, when assembling and applying the insert 54 as shown in FIGS. 3*d* and 3*e*, the inner layer 48 of PP remains above a softening temperature at which application of external pressure to the inner layer 48 can cause the PP to flow plastically. The optimum temperature is one at which the inner layer 48 has cooled to achieve self-supporting rigidity or viscosity but remains susceptible to plastic deformation under radially inward pressure applied via the insert 54. An exemplary temperature range in this respect is between 125° C. and 145° C. This can be achieved by removing the mould tool 26 before the inner layer 48 has cooled fully and then immediately forcing together the half-shells 56 of the insert 54 around the still-hot inner layer 48. In this respect, FIG. 4 shows that the half-shells 56 of the insert may be applied when the field joint 20 is at WS 9, immediately after IMPP moulding of the hourglass-shaped inner layer 48. However, FIG. 5 shows that the half-shells 56 of the insert 54 could instead be applied after advancing the field joint 20 to WS 10.

If needs be, and if critical path analysis allows, the inner layer 48 can be reheated before applying the half-shells 56 of the insert 54, for example by using an infra-red heater surrounding the field joint 20.

The consequence of pressing the half-shells 56 of the insert 54 into a still-soft inner layer 48 is shown in the sequence of enlarged detail views in FIGS. 3*f* to 3*h*. FIG. 3*f* shows one of the half-shells 56 lying loosely against the inner layer 48. FIG. 3*g* shows the half-shell 56 now pressed by one of the jaws 70 against the inner layer 48, which at this stage is not yet deformed by inward pressure exerted through the half-shell 56. FIG. 3*h* shows the half-shell 56 pressed further by the jaw 70 into the inner layer 48, which has flowed under the resulting inward pressure to deform plastically around the stiffer material of the half-shell 56.

As FIG. 3*h* shows, the result is that the contacting outer surface of the inner layer 48 conforms to the internal shape of the half-shell 56. The resulting flow of PP slightly reduces the thickness of the inner layer 48 between the end 64 of the half-shell 56 and the opposed edge chamfer 22 and between the central tubular wall of the half-shell 56 and the exposed surfaces 24 of the pipe joints 10. PP of the inner layer 48 displaced by the continuing inward movement of the half-shell 56 flows around the half-shell 56, which may therefore emboss or become partially embedded in the inner layer 48. This creates an intimately close fit between the half shell 56 and the inner layer 48, improving adhesion and mechanical engagement between them. The closeness of the fit reduces the possibility of cracks developing at interfaces between the half shell 56 and the inner layer 48 when the pipeline bends in use or during installation, spooling or straightening.

Returning to FIGS. 3*d* and 3*e*, these drawings shows one way in which part-tubular sections of an insert 54 such as half-shells 56 can be joined to each other to hold them together around a field joint 20. In this example of fastenings disposed on the half-shells 56, pins or barbs 72 projecting tangentially from a side face 58 of a first half-shell 56 are received in respective tangentially-extending holes or bores 74 in an opposed side face 58 of a second half-shell 56. Similar fastenings may be distributed the length of the insert and to both sides of the insert 54.

Specifically, in this example, each side face 58 of a half-shell 56 has an array of longitudinally-spaced barbs 72 that project orthogonally from that side face 58 in positions to align with correspondingly-spaced bores 74 in an opposed side face of the other half-shell 56. The barbs 72 alternate with bores 74 that positioned to align with correspondingly-spaced barbs 72 on the opposed side face 58. The arrangement of the barbs 72 and the bores 74 is such that when two half-shells 56 are aligned face-to-face for assembly to form the insert 54, the barbs 72 of each half-shell 56 align with the bores 74 of the other half-shell 56. Distal ends of the barbs 72 on each side face 58 of a half-shell 56 initially locate in the bores 74 in the counterpart side faces 58 of the opposed half-shell 56. Radially-inward pressure then forces the half-shells 56 together as the barbs 72 are urged deeper into the bores 74. The barbs 72 thus engage with the opposed bores 74 when the half-shells 56 are pressed together around the field joint 20 by the jaws 70.

Thus, the insert 54 is apt to be assembled in a simple providing speed, clamping strength and safety. The half-shells 56 are brought together as two halves from opposite sides of the field joint 20 and are assembled robustly in a simple press-fit operation with predictable and easily-verifiable results, if desired, the process could largely automated.

Slight resilience of the half-shells 56 helps to ensure a snug fit around the inner layer 48. The resilience of the half-shells 56 also applies a continuous clamping force to the pipe joints 10 via the inner layer 48. This clamping force helps to avoid movement of the insert 54 with respect to the field joint 20, whether axially along the pipe joints 10 or circumferentially around the pipe joints 10.

Moving on now to FIG. 3*i*, this shows a second mould tool 76 assembled around the field joint 20, where the insert 54 has previously been assembled around the inner coating 48 that overlies the pipe joints 10. The purpose of the second mould tool 76 is to overmould an outer layer 78 as seen in FIG. 3*j*.

FIGS. 4 and 5 show that overmoulding of the outer layer 78 is apt to be performed at WS 10 before quenching at WS 11 if needs be. Optionally, the external surface of the insert 54 and the exposed parts of the inner layer 48 and the edge chamfers 22 are heated, for example by infra-red heating, before overmoulding of the outer layer 78 takes place.

Again, the second mould tool 76 comprises a tube of generally circular cross-section formed of part-tubular mould parts that are clamped together. For example, as before, the tube is suitably divided longitudinally on a diameter of the cross-section into two halves 80. Clamping force between those halves 80 holds the second mould tool 76 in sealing engagement with the parent coatings 14 of the pipe joints 10 and resists internal pressure within a mould cavity 82 defined by the second mould tool 76.

Opposed tubular end portions 84 of the second mould tool 76 seat onto the outer surface of the parent coatings 14 and so have an internal diameter that substantially corresponds to the external diameter of the parent coatings 14. Conversely, a tubular central portion 86 between the end portions of the second mould tool 76 has a relatively thin wall and a correspondingly larger internal diameter that exceeds the external diameter of the parent coatings 14. This allows for contraction of the outer layer 78 after overmoulding.

The central portion 86 of the second mould tool 76 is spaced radially outwardly from the external surface 88 of the insert 54 to define the annular mould cavity 82 encircling that external surface. The mould cavity 82 also extends over the exposed end cones 52 of the inner layer 48 and the edge chamfers 22 and slightly overlaps the external surface of the parent coatings 14. The second mould tool 76 carries internal seals 90 that encircle the pipe joints 10 and seal against the external surface of the parent coatings 14 to define the longitudinal extremities of the mould cavity 82.

Again, the tubular wall of the second mould tool 76 is penetrated by one or ore gates 92 for injection of a liquid polymer into the mould cavity 82, in this example molten PP, supplied through teed lines 94 under pressure from a supplying reservoir or machine 96.

FIG. 3j shows the injection-moulded outer layer 78 of a field joint coating of the invention, immediately after removal of the second mould tool 76 shown in FIG. 3i. In this example, the outer layer 78 is of solid PP. The outer layer 78 corresponds to the shape and extent of the mould cavity 82 defined by the second mould tool 76. The outer layer 78 may take on a slightly narrowed, waisted shape as the PP contracts when it cools.

Turning next to FIGS. 6 to 8, these drawings show possible configurations of an insert 96 formed of part-tubular parts such as two half-shells 98.

FIG. 6 is a detail view that shows one of the half-shells 98 in isolation. The wall thickness of the half-shell 98 is exaggerated here to show fastenings and interengagement formations that are provided on its side faces 100. On assembly of the insert from two such half-shells 98, which are preferably identical, the side faces 100 of the half-shell 98 shown in FIG. 6 will cooperate with opposed side faces 100 of the other half-shell 98 of the insert 98. The fastenings and interengagement formations of the side faces 100 of the half-shell 98 are therefore mirrored with respect to a plane that contains those side faces 100.

One of the side faces 100, shown to the left in FIG. 6, comprises an inner longitudinally-extending row of tangentially-projecting pins or spigots 102 and an outer longitudinally-extending row of tangentially-extending holes 104. A longitudinally-extending groove 106 lies between those rows. The other of the side faces 100, shown to the right in FIG. 6, has a mirrored arrangement that comprises an outer longitudinally-extending row of spigots 102 and an inner longitudinally-extending row of holes 104. A longitudinally-extending ridge 108 lies between those rows.

As best appreciated in the sectional detail view of FIG. 7, the spigots 102 are shaped, spaced, positioned and dimensioned to engage with the holes 104 of another identical half-shell 98 and vice-versa. Similarly, the ridge 108 is shaped, positioned and dimensioned to fit into the groove 106 of another identical half-shell 98 and vice-versa. Thus, the spigots 102 and the holes 104 serve as fastenings and the mutually-complementary ridge 108 and groove 106 serve as optional interengagement formations that locate the half-shells 98 with respect to each other upon assembly of the insert 96.

One end of the resulting 96 is shown schematically in FIG. 8 of the drawings, which shows the half-shells 98 abutting along their mutually-opposed side faces 100. FIG. 8 also shows the hollowed frusta-conical concave profile at the end of the insert 96, which corresponds to the opposed convex contour of the end cones 52 of the inner layer 48.

Figure 9:
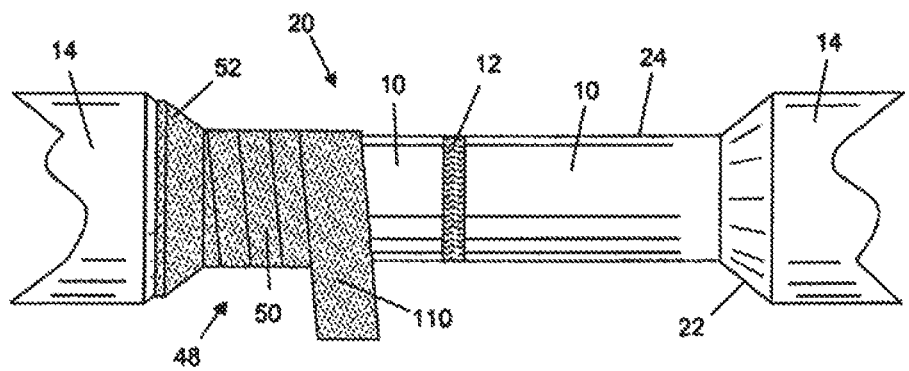
FIG. 9 is a schematic side view of an inner layer of a field joint coating being formed by winding a tape around a field joint.

FIG. 9 shows an alternative approach for forming the inner layer 48. Here, an hourglass-shaped inner layer 48 is being formed from overlapping coils of heated helically-wound tape 110 wrapped around the edge chamfers 22 and the exposed surfaces 24 of the pipe joints 10. A similar approach can be used for the finishing operations that may be performed at WS 10 in FIGS. 4 and 5.

Figure 10:
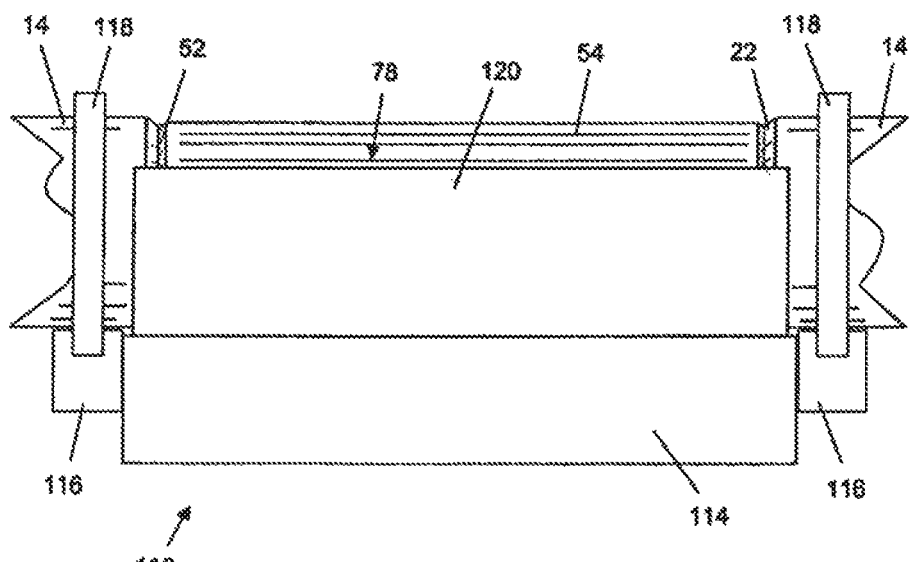
FIG. 10 is a schematic side view of an outer layer of a field joint coating being formed by side-wrapping an extruded wrap around a field joint.

FIG. 10 shows, schematically, an alternative approach for forming the outer layer 78. Again, a similar approach can be used for the finishing operations that may be performed at WS 10 in FIGS. 4 and 5. In FIG. 10, a side-wrap coating apparatus 112 comprises a robot head 114 driven by motors 116 along circumferential tacks 118 that are clamped to the outer surfaces of the parent coatings 14.

As it moves around the field joint along the tracks 118, the robot head 114 extrudes and wraps a molten polymer film 120 around the insert 54 to form the outer layer 78. The outer layer 78 is shown here only partially formed because the robot head 114 has yet to complete a full circuit of the field joint.

The film 120 covers the insert 54 and overlaps the end cones 52 of the inner layer 48 and the edge chamfers 22 of the parent coatings 14 to bond to the outer surfaces of the parent coatings 14. The method and apparatus are described fully in WO 2008/132279.

Figure 11A:
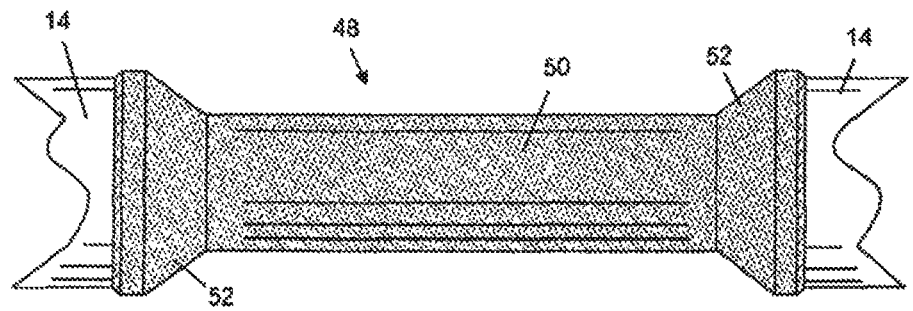
FIGS. 11a to 11c are sequence of schematic side views that illustrate the execution of method steps for producing an alternative field joint coating of the invention.
Figure 11B:
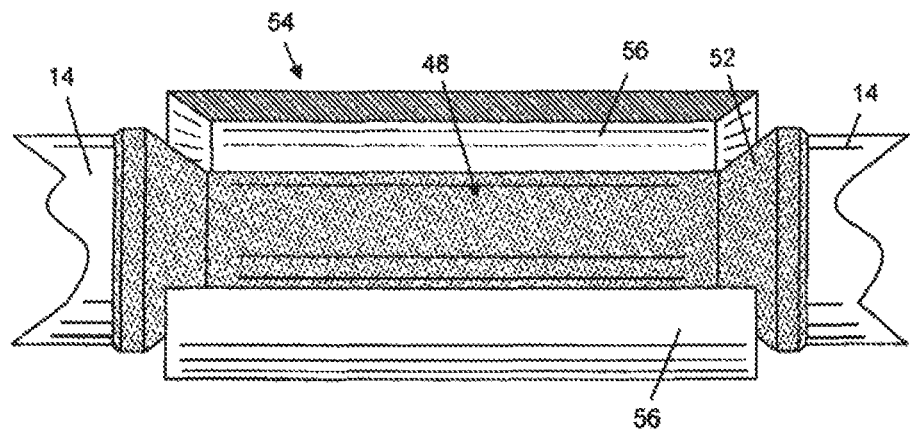
Figure 11C:
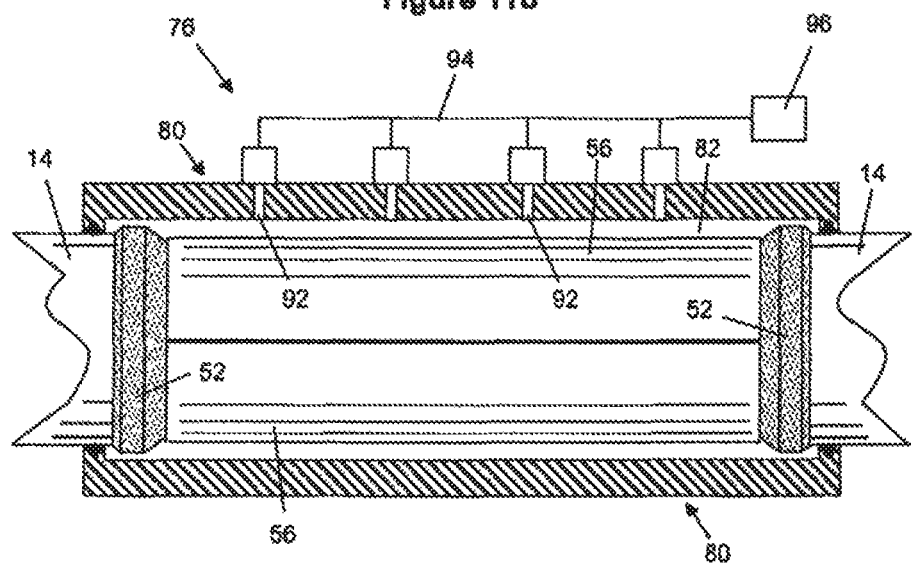

FIGS. 11a to 11c show an alternative configuration for an hourglass-shaped inner layer 48, whether that layer is moulded in accordance with FIGS. 3a to 3c or formed of tape in accordance with FIG. 9. Here, the inner layer 48 does not terminate longitudinally part-way along the edge chamfers 22 but instead overlaps the edge chamfers 22, thus extending onto and overlapping the external surfaces of the parent coatings 14. Otherwise, FIG. 11a corresponds to FIG. 3c, showing the field joint 20 surrounded by the inner layer 48, before the insert 54 is placed around the inner layer. FIG. 11b corresponds to FIG. 3d but omits the clamping apparatus, and shows the half-shells 56 of the insert 54 being assembled around the field joint 20. FIG. 11c corresponds to FIG. 3i, and shows a second mould tool 76 positioned around the assembly of the field joint 20 and the insert 54, ready to overmould an outer layer 78.

It will be noted from FIG. 11c that the mould cavity 82 encompasses the end cones 54 of the inner layer 48 that overlap the external surfaces of the parent coatings 14. Thus, the outer layer 78 will extend longitudinally outboard of the inner layer 48 in this example. However, it would be possible for the arrangement instead to be reversed so that the outer layer 78 terminates longitudinally inboard of the overlapping end cones 52 of the inner layer 54.

Figure 12:
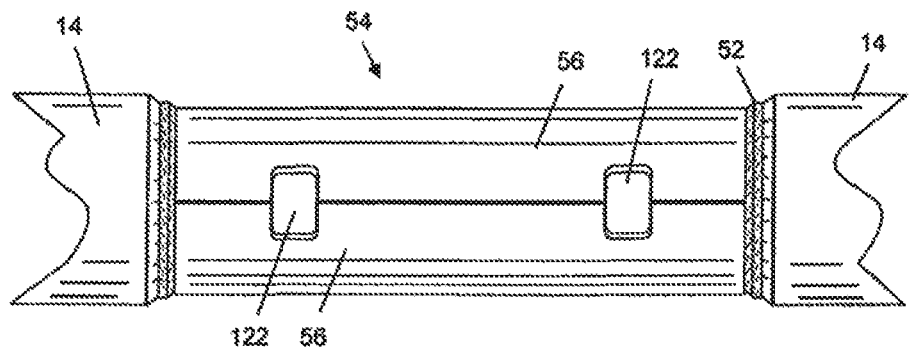
FIGS. 12 and 13 are schematic side view showing alternative approaches for securing an insert around a field joint.
Figure 13:
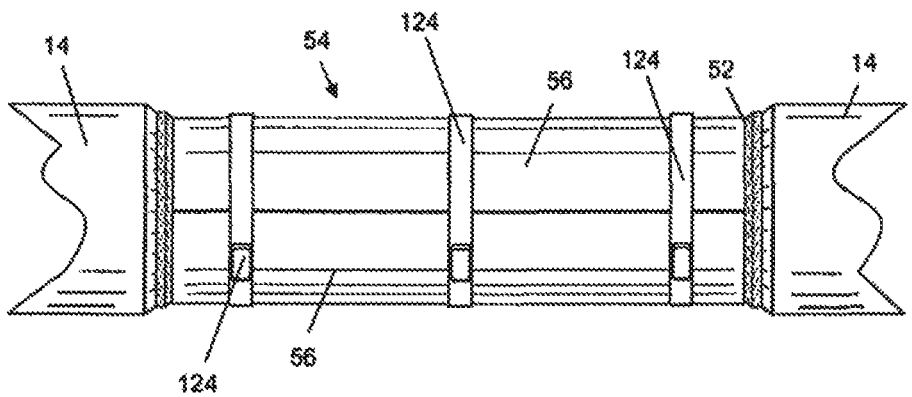

FIGS. 12 and 13 show some alternative approaches for holding together part-tubular parts of an insert 54, again exemplified here as half-shells 56. FIG. 12 shows alternative fastenings comprising a key or latch 122 that, by resilient engagement, an over-centre action or a snap-fit, engages the half-shells 56 and bridges the joint between them. In FIG. 13, tensile straps or bands 124 extend circumferentially around the half-shells 56 and are tightened to pull the half-shells 56 together.

FIGS. 14 to 21 show various options for the relative dispositions of the in layer 48, the insert 54 and the outer layer 78 with respect to the edge chamfer 22 and the external surface of the adjacent parent coating 14. For clarity, the inner layer 48 is not shown in these drawings as being deformed by radially-inward pressure exerted via the insert 54, as is shown in FIGS. 3f to 3h.

FIGS. 14 to 17 have some features in common. In particular, the flared end cone 52 of the hourglass-shaped inner layer 48 extends only partially along the edge chamfer 22. Thus, the end cone 52 extends radially outwardly relative to the exposed external surface 24 of the underlying pipe joint 10 but terminates radially inwardly relative to the outer surface of the parent coating 14. Also, the outer layer 78 extends longitudinally beyond the edge chamfer 22 to overlap onto the outer surface of the parent coating 14.

Figure 14:
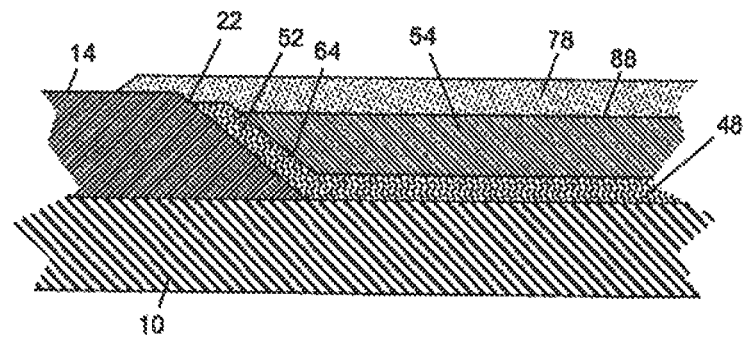
FIGS. 14 to 21 are schematic enlarged detail side views showing various relative dispositions of the inner layer, the insert and the outer layer of field joint coatings of the invention.
Figure 15:
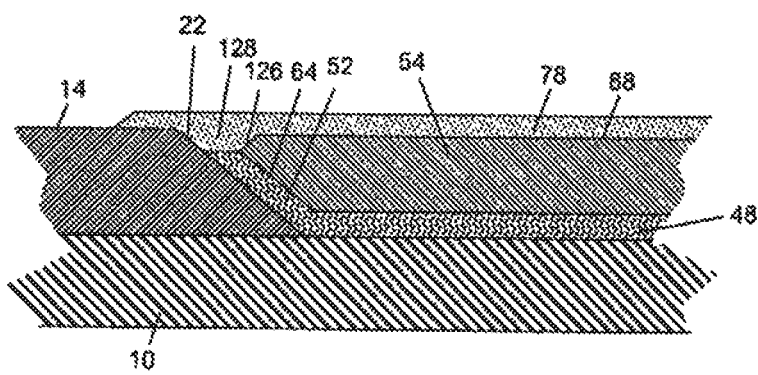

FIGS. 14 and 15 have a further feature in common, which is that the frusto-conical end 64 of the insert 64 substantially matches the inclination of, and lies tightly against, the end cone 52 of the inner layer 48 that lies, in turn, against the edge chamfer 22.

In FIG. 14, the radially outer side 88 of the insert 54 lies radially inwardly with respect to the radially outer edge of the end cone 52 of the inner layer 48. Thus, the end of the insert 54 extends only partially along the end cone 52. This arrangement is currently preferred because it reduces the number and length of interface surfaces between the inner layer 48, the insert 54, the outer layer 78, the edge chamfer 22 and the external surface of the parent coating 14.

In contrast, FIG. 15 shows the radially outer side 88 of the insert 54 lying radially outwardly with respect to the radially outer edge of the end cone 52 of the inner layer 54. In this example, the radially outer side 88 of the insert 54 optionally lies on substantially the same radius as the outer surface of the parent coating 14. Also, the end 64 of the insert 54 extends fully along the end cone 52 of the inner layer 48. This leaves a radially-overlapping portion of the insert 54 that extends radially beyond the end cone 52 and that is spaced longitudinally from the edge chamfer 22.

Optionally, the radially-overlapping portion of the insert 54 may be bevelled as shown in FIG. 15. This bevel 126 promotes flow of the material of the outer layer 78, during overmoulding, into the shallow gap 128 between the insert 54 and the edge chamfer 22, which gap 128 it disposed radially outwardly from the end cone 52 of the inner layer. 48

Figure 16:
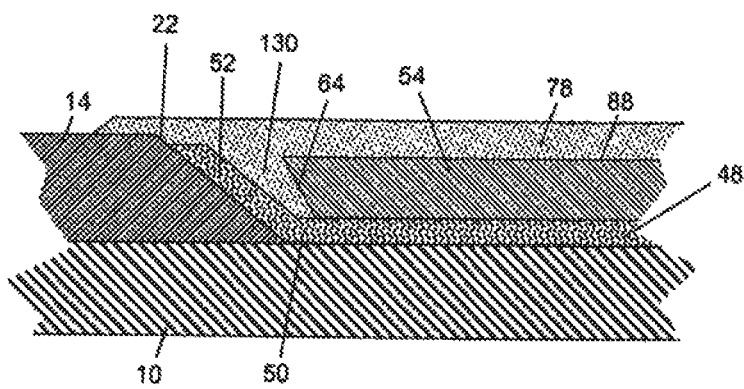
Figure 17:
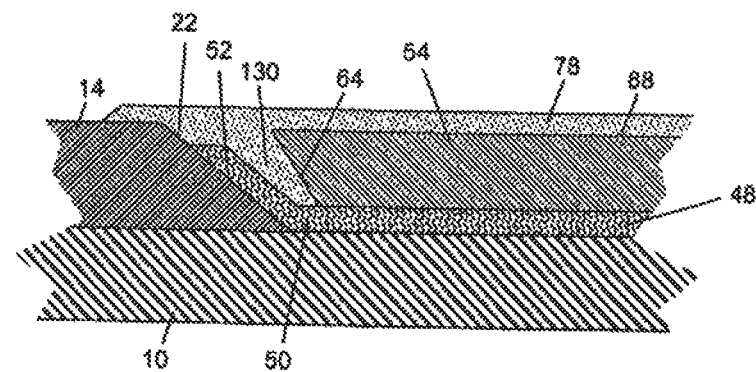

FIGS. 16 and 17 have a different feature in common, which is that the end of the insert 54 is spaced from the end cone 52 of the inner layer 48. This leaves a deep gap 130 between the end 64 of the insert 54 and the end cone 52. The material of the outer layer 48 flows in to fill that gap 130 during overmoulding.

Where is a gap 130 between them, the inclination of the end 64 of the insert 54 does not have to match the inclination of the end cone 52 of the inner layer 48. In the examples shown, the end 64 of the insert 54 splays apart from the end cone 52 in the radially outward direction. The resulting radially-inward taper of the gap 130 eases inward flow of the material of the outer layer 78 into the gap 130 during overmoulding. Indeed, the inclination of the end 64 of the insert 54 could be reversed to face away from the end cone 52, maximising the ease of inward flow of the material of the outer layer 78.

The gap 130 between the end 64 of the insert 54 and the end cone 52 of the inner layer 48 can extend radially inwardly to any depth. In these examples, the gap 130 is deep enough to expose part of the central tubular portion 50 of the inner layer 48.

Figure 18:
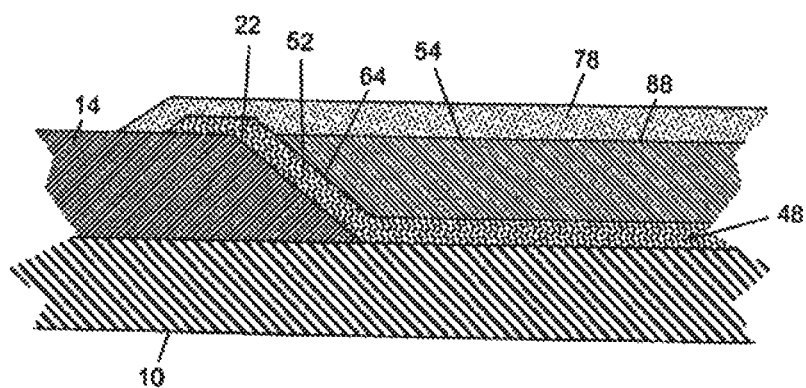
Figure 19:
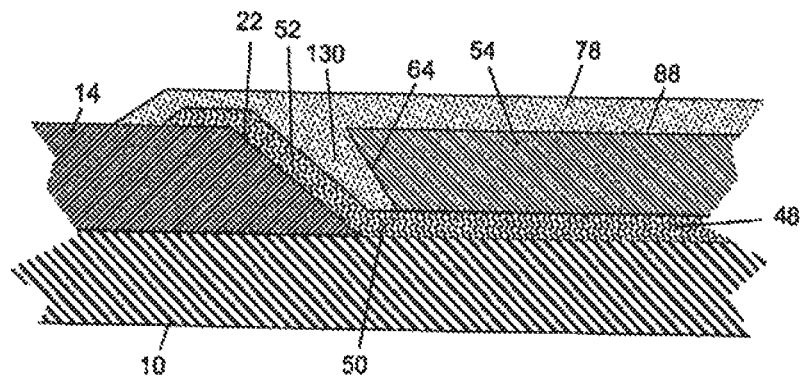

In FIGS. 18 and 19, the end cone 52 of the inner layer 48 extends along the full length of the edge chamfer 22 and overlaps onto the outer surface of the parent coating 14. Thus, the end cone 52 extends longitudinally beyond the edge chamfer 22. The outer layer 78 overlies, and extends longitudinally beyond, the overlapping part of the end cone 52 to join the outer surface of the parent coating 14 at a position longitudinally outboard of the end cone 52. Optionally, as also shown, the radially outer side 88 of the insert 54 lies on substantially the same radius as the outer surface of the parent coating 14.

In both of the examples shown in FIGS. 18 and 19, the end cone 52 extends radially outwardly beyond the outer surface 88 of the insert 54. Whilst in principle would be possible to have an opposite arrangement in which the outer surface 88 of the insert 54 extends radially outwardly beyond the end cone 52, in practice the overlying outer layer 78 could protrude too far radially in that case.

FIG. 18 shows the frusto-conical end 64 of the insert 54 substantially matching the inclination of, and lying tightly against, the end cone 52 of the inner layer 48, like FIGS. 14 and 15. In contrast, like FIGS. 16 and 17, FIG. 19 shows the end 64 of the insert 54 spaced from the end cone 52 to leave a deep gap 130 between the end of the insert 54 and the end cone 52, into which the material of the outer layer 78 flows during overmoulding. Again, that gap 130 is shown here as extending radially inwardly to the extent that it exposes part of the central tubular portion 50 of the inner layer 48. Similarly, the inclination of the end 64 of the insert 54 may differ from the inclination of the end cone 52, resulting in a gap 130 that tapers radially inwardly as shown, and the inclination of the end 64 of the insert 54 could be reversed to face away from the end cone 52.

A bevel 126 like that shown in FIG. 15 could be applied to any of the inserts 54 shown in FIGS. 18, 17 and 19, for the same purpose of as inward flow of the material of the outer layer 78 into the gaps 130 of those embodiments.

Figure 20:
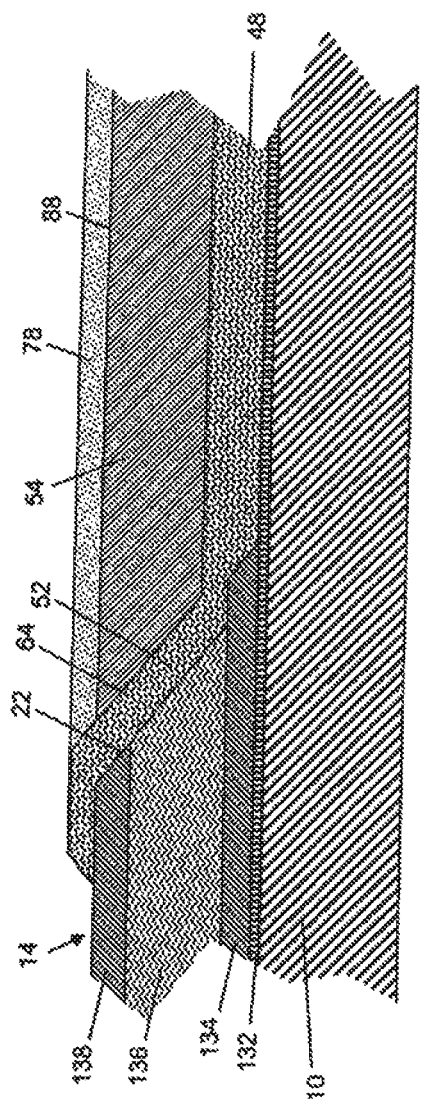
Figure 21:
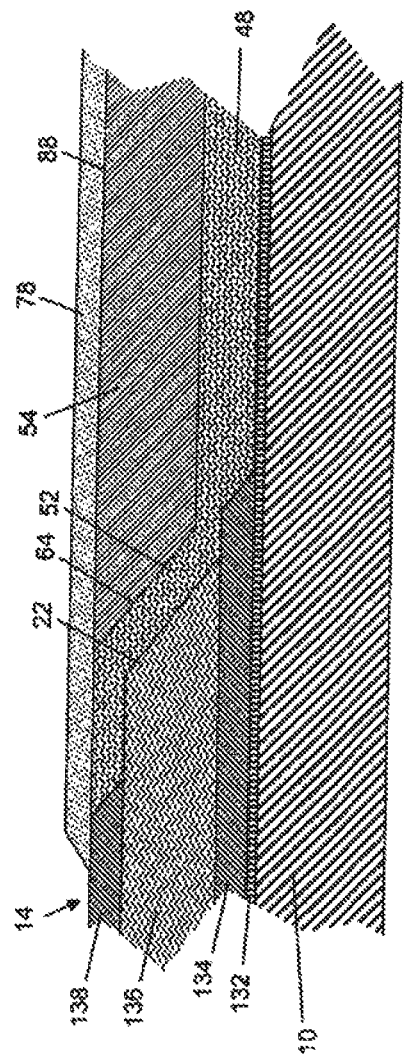

FIGS. 20 and 21 show further possible variants of the invention in more detail than FIGS. 14 to 19. In these drawings, the 5LPP parent coating 14 is shown in layered detail, comprising: an FBE primer layer 132 over the pipe joint 10; an inner coating layer 134 that comprises a thin layer of PP bonded to the primer and a thicker layer of extruded PP applied over the thin bonded layer; an intermediate coating layer 136 of PP modified for thermal insulation, exemplified here by GSPP or a foam; and an outer coating layer 138 of extruded PP. In this example, optionally, the edge chamfer 22 is stepped such that the inner coating layer 134 protrudes longitudinally into the annular gap that accommodates the insert 54. This ensures better tightness. Optionally, as also shown in FIGS. 20 and 21, the radially outer side 88 of the insert 54 lies on substantially the same radius as the outer surface of the parent coating 14.

In the variant of FIG. 20, the outer coating layer 138 has a chamfered face in alignment with the chamfered face of the intermediate coating layer 136. Conversely, the edge chamfer 22 in the variant of FIG. 21 is further stepped, that the outer coating layer 138 is cut back, with a chamfer, from the chamfered face of the intermediate coating layer 136.

In FIG. 20, the end cone 52 of the inner layer 48 extends along the full length of the edge chamfer 22 and overlaps onto the outer surface of the parent coating 14. Thus, the end cone 52 extends longitudinally beyond the edge chamfer 22 onto the outer surface of the parent coating 14. This is similar to the arrangement shown in FIGS. 18 and 19. However, unlike the arrangement shown in FIGS. 18 and 19, the outer layer 78 does not overlie or extend longitudinally outboard beyond the overlapping part of the end cone 52. Instead, that arrangement is reversed so that the outer layer 78 terminates against the longitudinally inboard side of the end cone 52. Beneficially for the overall thickness of the field joint coating, this allows the outer layer 78 to be kept flush with, or even to be kept radially within, the radial extremity of the end cone 52.

The arrangement shown in FIG. 21 achieves a similarly beneficial reduction of the overall thickness of the field joint coating by recessing an overlapping part of the end cone 52 into the space created by cutting back the outer coating layer 138. The outer layer 78 can now overlie and extend longitudinally outboard beyond the overlapping part of the end cone 52 without adding to the thickness of the field joint coating.

In general, it may be preferred that the outer layer 78 overlaps beyond the edge chamfers 22, for example onto the outer surface of the parent coating 14. This because a typical overlap of 50 mm to 75 mm allows a large tolerance in the axial length of the gap between the edge chamfers 22 that accommodates the insert 54.

Turning finally to FIGS. 22a and 22b, these drawings show how an insert 140 may be adapted for increased longitudinal flexibility. This adaptation enables the insert 140 to bend more easily along its length as the underlying pipe joints 10 bend. Whilst shown in the context of the arrangement of the inner and outer layers 48, 78 as shown in FIG. 18, a similar insert 140 could of course be used in any of the preceding embodiments.

The insert 140 shown FIGS. 22a and 22b comprises a longitudinal series segments 142 connected by joints or links 144, such that the segments 142 alternate with the links 144 along the length of the insert 140. Broadly, the segments 142 and the links 144 of the insert 140 together behave like a vertebral column or spine, in which the segments are akin to vertebrae and the links are akin to intervertebral discs interleaved between the vertebrae.

In the example shown in FIGS. 22a and 22b, the segments 142 and the links 144 are annular discs or hoops that encircle the pipe joints 10 and that are integral with each other to form a one-piece insert 140. Both sides of each segment 142 are flat and lie in parallel planes that are orthogonal to the central longitudinal axis of the pipe joints 10. The dimensions end numbers of segments 142 and links 144 may be chosen to suit the material used for the insert 140, the performance requirements of the field joint coating and expected strains that determine the requirement for resilience in the field joint and its coating.

The segments 142 and the links 144 are flush on their radially inner sides where the radially inner face of the insert 140 lies against the underlying pipe joints 10. However, the links 144 are substantially shallower in the radial direction than the segments 142, thus defining a castellated longitudinal section on the radially outer face of the insert 140. The resulting gaps 146 between adjacent segments 142 allow clearance for relative angular displacement between the segments 142 as the pipeline and hence the insert 140 bends along its length.

By way of example, each segment 142 may be about 30 mm wide longitudinally and about 30 mm high radially, atop a radially-inward core tube 148 that is about 30 mm thick radially. Thus, the insert 142 has a radial thickness of about 60 mm atop the hourglass-shaped inner layer 48. In this example, the gaps 146 between two successive segments 142 may be about 15 mm wide longitudinally and about 33 mm deep radially.

When an outer layer 78 is over-moulded by casting or injection around the insert 140, the material of the outer layer 78 flows into and fills the gaps 146 between the segments 142 as shown in FIG. 22b. The material of the outer layer 78 is flexible enough to accommodate angular displacement between the segments 142 when the insert 140 bends.

The segments 142 of the insert 140 are preferably of a substantially solid thermally-insulating material such as GSPP. The links 144 can be made flexible relative to the segments 142 in various ways. The segmented, jointed arrangement of the insert 140 confers flexibility on the insert 140 to bend along its length in response to corresponding bending of the pipeline. The readiness of the insert 140 to bend in this way reduces stress in a field joint coating that incorporates the insert 140. This reduces initiation and propagation of cracks in and between the layers 48, 78 and the insert 140 of the field joint coating and between those layers 48, 78, the insert 140 and the adjacent parent coatings 14.

The links 144 may be of the same material as the segments 142, as shown in FIGS. 22a and 22b, or may be of a different material. The links 144 could be intrinsically flexible either by virtue of their material or their structure, cross-sectional shape or dimension. In this example, the links 144 and segments 142 are all integral with each other in a one-piece insert 140, which could be machined into its final shape from a moulded or cast block of material or moulded directly in that final shape. Where they are of the same material as the segments 142, the links 144 may be integral with the segments 142 as shown, being relatively shallow or thin in the radial direction to confer greater relative flexibility on the links 144. Thus, the links 144 shown in FIGS. 22a and 22b are relatively thin webs that bridge the gaps 146 to connect adjacent segments 142.

The insert 140 can bend without significantly affecting its ability to insulate the pipeline. In this respect, it will be noted that the insulating segments 142 extend to substantially the same radius as the thickness of the parent coating 14. Also, the segments 142 are able to withstand radially-inward compressive forces experienced by the pipeline during spooling and installation and under hydrostatic pressure in use.

If of a different material to the segments 142, the links 144 may be of a more flexible material than the segments 142. In that case, the links 144 need not be shallower or thinner in the radial direction than the segments 142, although they could be. Indeed, the links 144 may be as thick in the radial direction as the segments 142. For example, the links 144 could be of a resilient rubber or gel-like materiel that may be interleaved between the segments 142 or moulded between the segments 142.

The insert could instead be an assembly of elements comprising a plurality of segments and a plurality of links. Such elements lay or may not be of the same material. Each link could comprise two or more substantially rigid parts that are hinged, jointed or articulated to confer flexibility on the link as a whole.

The outer layer could be replaced with insulating infill mouldings of a flexible insulating material that are shaped to fill the gaps between segments of an insert. The infill mouldings could be moulded separately from and assembled with the insert or may be moulded in situ around and between the segments of the insert, by piecing the insert in a secondary mould for overmoulding with the infill material as described above.

Many other variations are possible within the inventive concept. For example, the pipeline may intermittently be held stationary or may move continuously along the firing line during assembly of the insert from the half-shells. Thus, the clamping apparatus shown schematically in FIGS. 3d and 3e may take other forms to allow for continuous movement of the pipeline. For example, the jaws may be supported by a longitudinally-reciprocating carriage that allows the half-shells to be engaged while the pipeline is moving along the firing line. Thus, during an engagement stroke of the jaws, the carriage can move longitudinally from a start position in the direction of movement of the pipeline as the jaws also come together to assemble the insert. Once the half-shells are fully engaged at the end of the engagement stroke, the jaws separate to free the insert and the carriage moves back to the start position against the direction of movement of the pipeline, during a return stroke of the jaws.

The barbs and the bores on the cooperable parts that make up an insert may have various configurations or may be replaced with other fastenings. For example, a barb may be replaced by a spigot with an enlarged head that snap-fits resiliently into an undercut recess in an opposed bore when the half-shells are pressed together. Alternatively, the cooperable parts of an insert may comprise complementary ratchet formations.

Half-shells or other part-tubular sections of an insert n be pressed radially inwardly into contact with the inner layer by a pressing member other than a jaw, by a tensioning apparatus comprising ratchet straps, by a torque-gauged device or bar external fluid pressure to promote attachment of the insert to the inner layer. Once assembled, the part-tubular sections of the insert can be held together and/or to the inner layer by adhesive, by mechanical engagement, by external fastenings or by fusing, welding or other bonding.

To improve bonding or adhesion between the various components of the field joint coating, the insert could be pre-coated or overmoulded with a skin of PP or of another polymer that is compatible with the inner layer shown in FIG. 3c and/or with an outer layer shown in FIG. 3j. The skin could cover the insert fully or only partially. The skin could be supplemented with, or replaced by, a layer of adhesive.

The half-shells may be of cast or injection-moulded plastics material and the barbs may be of steel, although other materials are possible. Half-shells may be moulded around the barbs in an insert or outsell moulding process or the barbs may be engaged in mounting holes provided in pre-moulded half-shells. There may, for example, be a threaded engagement between the barbs and the mounting holes. Alternatively, there may be an interference fit between the barbs and the mounting holes, whose strength may be increased by ribbing, threading or otherwise texturing a root portion of a barb to be received in a mounting hole.

Many different profiles or textures such as ribbing, threading or knurling may be applied to the barbs to tailor insertion and withdrawal forces into and out of the bores. Various examples of such barb profiles are discussed in WO 2013/008021.

The half-shells may be joined by a pivot or hinge arrangement to close around the field joint in a clamshell arrangement. In that case, the half-shells suitably pivot relative to each other about a longitudinal pivot axis extending parallel to the central longitudinal axis 18 of the pipe joints 10.

As is known from prior art such as WO 2012/004665, each gate of a mould tool may have a respective valve that controls the injection of liquid polymer through that gate. The valves may be controlled by a central control unit and may be operated independently of each other. These and other mould tool features have been omitted from FIGS. 3b and 3i for simplicity, such as vents to allow air to escape as the mould cavity fills with liquid polymer, and external clamps. Also, if the liquid polymer is of molten thermoplastics such as PP, a cooling system may be provided to accelerate hardening of the melt. The cooling system could, for example, comprise a water jacket disposed in or on the tubular wall of the mould tool.

Additives or modifiers may be employed in the insert or the field joint coating, such as an elastomeric modifier like EDPM (ethylene propylene diene monomer rubber) to provide appropriate flexibility and impact resistance, or fibres of glass, aramid or carbon to increase strength and elastic modulus.

Thermoplastics material used for injection-moulding the insert or the field joint coating may be PP, polystyrene or any other suitable thermoplastics material that is compatible with the coating applied to the pipe joints. Additives such as fibres may reduce shrinkage and accelerate cooling.

Those skilled in the art will appreciate that combinations of features of embodiments disclosed above are possible, even those combinations are not explicitly recited in the foregoing description.

The invention claimed is:

1. A field joint arrangement for a pipeline, comprising:
pipe lengths joined end-to-end at a joint;
thermally-insulating parent coatings on each of the pipe lengths, the parent coatings having chamfered edges that are spaced from the joint in mutual opposition about a longitudinally-extending gap; and
an annular field joint coating that comprises:
an hourglass-shaped inner layer that surrounds the pipe lengths, extends longitudinally along the gap between the chamfered edges and has inclined end parts that at least partially overlie the respective chamfered edges;
a thermally-insulating solid insert disposed in the gap, the insert being made up of two or more parts that cooperate to surround the inner layer; and
an outer layer surrounding the insert that forms a watertight barrier and has one or more melted interfaces with the inner layer.

2. The arrangement of claim 1, further comprising an anti-corrosion layer and an adhesive primer layer interposed between the pipe lengths and the inner layer.

3. The arrangement of claim 1, wherein the parts of the insert are held together by tension to maintain radially-inward pressure on the inner layer.

4. The arrangement of claim 3, wherein the parts of the insert are held together by one or more straps under tension.

5. The arrangement of claim 3, wherein the parts of the insert are held together by one or more clips under resilient tension.

6. The arrangement of claim 3, wherein the parts of the insert are held together by barbs of one of those parts engaged with holes of another of those parts, that engagement maintaining resilient deflection of the parts to keep the barbs under tension.

7. The arrangement of claim 6, wherein the barbs are an interference force-fit within the holes.

8. The arrangement of claim 3, wherein the inner layer is elastically compressed by the radially-inward pressure.

9. The arrangement of claim 3, wherein the inner layer has been plastically deformed by virtue of radially-inward pressure exerted through the insert.

10. The arrangement of claim 1, wherein the insert is of a softer material than the inner layer.

11. The arrangement of claim 1, wherein the inner layer is a moulding formed around the joined pipe lengths.

12. The arrangement of claim 1, wherein the inner layer comprises a tape or side-wrap, wound or wrapped around the joined pipe lengths.

13. The arrangement of claim 12, wherein the side-wrap is extruded in situ.

14. The arrangement of claim 1, wherein the outer layer is a moulding formed around the insert.

15. The arrangement of claim 1, wherein the outer layer comprises a side-wrap, wrapped around the insert.

16. The arrangement of claim 1, wherein the insert and the inner layer cooperate to fill the longitudinally-extending gap between the chamfered edges of the parent coatings.

17. The arrangement of claim 16, wherein the insert has end faces inclined to lie closely against the end parts of the inner layer.

18. The arrangement of any claim 1, having gaps between end faces of the insert and the end parts of the inner layer, which gaps are filled by material of the outer layer.

19. The arrangement of claim 1, wherein the end parts of the inner layer extend longitudinally beyond the outer layer, which seals against the end parts of the inner layer at melted interfaces.

20. The arrangement of claim 1, wherein the outer layer extends longitudinally beyond the end parts of the inner layer to bond to the parent coatings outboard of melted interfaces with the end parts of the inner layer.

21. The arrangement of claim 20, wherein the outer layer bonds to the chamfers of the parent coatings.

22. The arrangement of claim 1, wherein the end parts of the inner layer extend longitudinally beyond the chamfered edges to bond to radially outer surfaces of the parent coatings.

23. The arrangement of claim 1, wherein the end parts of the inner layer terminate on the chamfered edges, radially inwardly with respect to radially outer surfaces of the parent coatings.

24. The arrangement of claim 1, wherein the end parts of the inner layer terminate radially inwardly with respect to a radially outer surface of the insert.

25. The arrangement of claim 1, wherein the end parts of the inner layer extend radially outwardly beyond a radially outer surface of the insert.

26. The arrangement of claim 1, wherein a radially outer surface of the insert lies at substantially the same radius as radially outer surfaces of the parent coatings.

27. The arrangement of claim 1, wherein the end parts of the inner layer terminate radially at substantially the same radius as a radially outer surface of the outer layer.

28. The arrangement of claim 1, wherein the chamfered edges each comprise at least one step coinciding with a boundary between layers of the parent coatings.

29. The arrangement of claim 28, wherein an inner layer of each parent coating protrudes longitudinally into the gap from the chamfered edge.

30. The arrangement of claim 28, wherein the end parts of the inner layer extend into spaces defined by cutting back an outer layer of each parent coating from the chamfered edge.

31. The arrangement of claim 1, wherein the insert comprises a longitudinal series of segments alternating with relatively flexible links.

32. The arrangement of claim 31, wherein the links are relatively thin parts of the insert leaving gaps between the segments on a radially outer side of the links, which gaps are filled by material of the outer layer.

33. The arrangement of claim 1, wherein the inner and the outer layers each have a thickness of between one sixth and one quarter of the aggregate thickness of an assembly comprising the inner layer, the insert and the outer layer.

34. The arrangement of claim 33, wherein the insert has an overall thickness of between one half and two thirds of the aggregate thickness of said assembly.

35. A subsea pipeline comprising at least one field joint arrangement in accordance with claim 1.

\* \* \* \* \*